US012700908B2

(12) United States Patent
Chiskis

(10) Patent No.: US 12,700,908 B2
(45) Date of Patent: Aug. 4, 2026

(54) PRE-PROCESSING FOR CSI COMPRESSION

(71) Applicant: Sequans Communications SA, Colombes (FR)

(72) Inventor: Alexander Chiskis, Tel Aviv (IL)

(73) Assignee: Sequans Communications SA, Colombes (FR)

( * ) Notice: Subject to any disclaimer, the term of this patent is extended or adjusted under 35 U.S.C. 154(b) by 0 days.

(21) Appl. No.: 18/748,613

(22) Filed: Jun. 20, 2024

(65) Prior Publication Data

US 2025/0392368 A1 Dec. 25, 2025

(51) Int. Cl.
*H04W 24/10* (2009.01)
*H04B 7/06* (2006.01)

(52) U.S. Cl.
CPC ......... *H04B 7/0663* (2013.01); *H04B 7/0626* (2013.01); *H04W 24/10* (2013.01)

(58) Field of Classification Search
CPC .... H04B 7/0663; H04B 7/0626; H04W 24/10
USPC ........................................................ 375/367
See application file for complete search history.

(56) References Cited

U.S. PATENT DOCUMENTS 11,424,807 B2 8/2022 Ahmed Salem et al.
2008/0080634 A1* 4/2008 Kotecha ............... H04B 7/0634
375/267

OTHER PUBLICATIONS

Ahmed, R., et al., "Overhead Reduction of NR type II CSI for NR Release 16", 23rd International ITG Workshop on Smart Antennas, Vienna, Austria, 2019, pp. 1-5.
"Evaluation on AI/ML for CSI feedback enhancement", R1-2203550, 3GPP TSG RAN WG1 #109-e, e-Meeting, May 9-20, 2022, retrieved from https://www.3gpp.org/ftp/tsg_ran/WG1_RL1/TSGR1_109-e/ Docs?sortby=sizerev, 29 pages.
Guo, J., et al., "Overview of Deep Learning-Based CSI Feedback in Massive MIMO Systems," IEEE Transactions on Communications, 2022, vol. 70, No. 12, pp. 8017-8045.
Proakis, J. G., et al., Digital Communications, 5th edition, Chapter 16.4 Multiuser MIMO Systems for Broadcast Channels, 2008, pp. 1053-1067.
Qin, Z., et al., "A Review of Codebooks for CSI Feedback in 5G New Radio and Beyond", retrieved from https://arxiv.org/abs/2302. 09222, 2023, pp. 1-11.

(Continued)

*Primary Examiner* — Dominic D Saltarelli
(74) *Attorney, Agent, or Firm* — ONE LLP

(57) ABSTRACT

One example embodiment includes a wireless communication system. The wireless communication system includes a UE. The UE is configured to calculate DL channel-related information, preprocess the DL channel-related information using a unitary matrix to generate post-processing information, compress the post-processing information to generate transmission data, and communicate the transmission data over a communication channel. The wireless communication system includes a base station. The base station is configured to receive the transmitted data, decompress the received data to reconstruct the post-processing information, and construct a DL precoder utilizing the reconstructed post-processing information. Some aspects are related to AI-based or Classical schemes-based CSI-compression. Some embodiments seamlessly merge the treatment of the interference problem with the CSI-compression.

12 Claims, 15 Drawing Sheets

(56)     References Cited

OTHER PUBLICATIONS

Telatar, I. E., "Capacity of multi-antenna Gaussian channels," European Transactions on Telecommunications, 1999, vol. 10, No. 6, pp. 1-28.

Xiao, H., et al., "AI Enlightens Wireless Communication: A Transformer Backbone for CSI Feedback", retrieved from https://arxiv.org/abs/2206.07949, 2022, pp. 1-14.

Yang, Q., et al., "Deep Convolutional Compression For Massive MIMO CSI Feedback," 29th International Workshop on Machine Learning for Signal Processing (MLSP), Pittsburgh, PA, 2019, retrieved from https://arxiv.org/abs/1907.02942, pp. 1-7.

* cited by examiner

PRE-PROCESSING FOR CSI COMPRESSION

TECHNICAL FIELD

The present disclosure relates generally to wireless communication and, more specifically, to enhancing precoding and channel state information (CSI) compression in wireless communication systems.

BACKGROUND

Wireless communication has become integral to modern life, facilitating seamless connectivity for voice, data, and multimedia across global networks. This technological domain has evolved dramatically, driven by escalating demands for higher data rates and more robust, reliable connections. Traditional wireless systems, however, often struggle with challenges such as interference, signal attenuation, and the unpredictable dynamics of mobile environments, all exacerbated by the limited availability of spectrum resources.

As the number of connected devices continues to soar and the volume of data transmitted grows exponentially, there is a pressing need for innovations that can enhance spectral efficiency and optimize network performance. This necessity underscores the importance of developing advanced technologies, such as sophisticated precoding techniques. These technologies aim to improve signal clarity and reduce interference, thereby maximizing the capacity and efficiency of wireless networks. Such advancements may help with meeting the burgeoning demands of modern wireless communication systems and setting the stage for the next generation of connectivity solutions.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One example embodiment includes a wireless communication system. The wireless communication system includes a User Equipment (UE). The UE is configured to calculate downlink (DL) channel-related information, preprocess the DL channel-related information using a unitary matrix to generate post-processing information, compress the post-processing information to generate transmission data, and communicate the transmission data over a communication channel. The wireless communication system includes a Base Station (BS), e.g., a next generation Node B (gNB). The base station is configured to receive the transmitted data, decompress the received data to reconstruct the post-processing information, and construct a DL precoder utilizing the reconstructed post-processing information.

One example embodiment includes a UE for use in a wireless communication system. The UE includes a memory storing computer-executable instructions, and at least one processor coupled to the memory and configured to execute the computer-executable instructions. The computer-executable instructions are to calculate DL channel-related information, preprocess the DL channel-related information using a unitary matrix to generate post-processing information, compress the post-processing information to generate transmission data, and communicate the transmission data over a communication channel.

One example embodiment includes a Base Station for use in a wireless communication system. The Base Station includes a memory storing computer-executable instructions and at least one processor coupled to the memory and configured to execute the computer-executable instructions. The computer-executable instructions cause the Base Station to receive transmission data communicated over a communication channel from a User Equipment (UE), decompress the received transmission data to reconstruct post-processing information, and construct a DL precoder, where the precoder comprises a first factorization component (W1) (known or optimized separately) and the second factorization component (W2) based on the reconstructed post-processing information, with the full precoder being W=W1*W2.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

The detailed description set forth below in connection with the appended drawings is intended as a description of configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
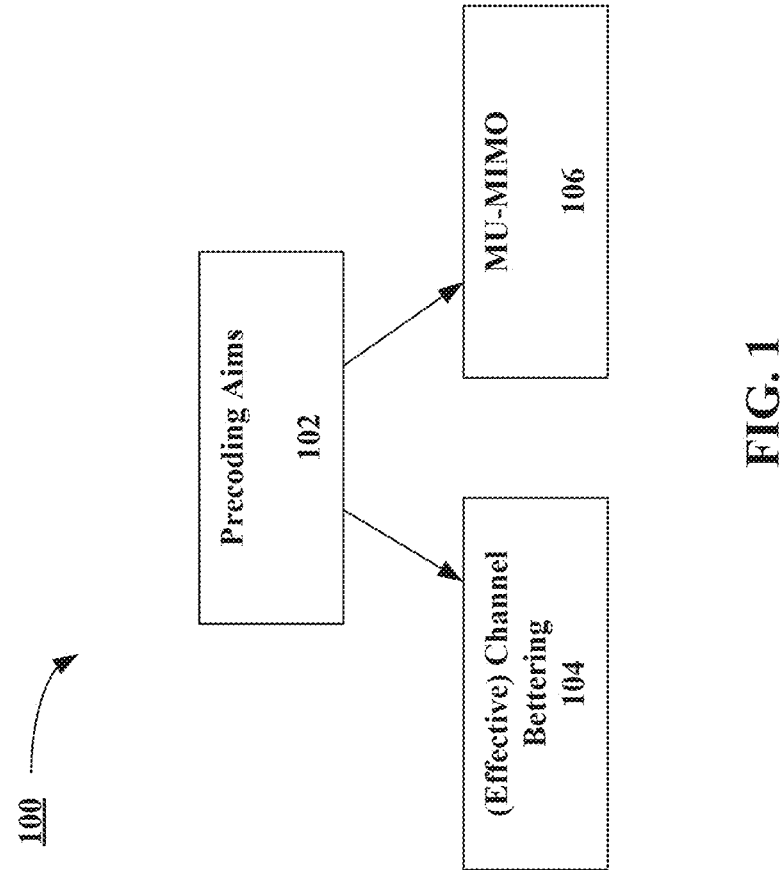
FIG. 1 is a diagram illustrating two major aims of precoding, effective channel bettering and Multi-User Multiple Input Multiple Output (MU-MIMO).

FIG. 1 is a diagram 100 illustrating two major aims of precoding, effective channel bettering 104 and Multi-User Multiple Input Multiple Output (MU-MIMO) 106. The purpose of effective channel bettering is to enhance the quality of the communication channel between the transmitter and the receiver, and improving signal clarity. On the other hand, MU-MIMO is a wireless technology that allows the transmission and reception of more than one data signal simultaneously over the same radio channel by exploiting multiple antennas at both the transmitter and receiver ends.

This technology enables multiple users to access the same transmission resources concurrently, greatly increasing the efficiency and capacity of the network. It can be further demonstrated that the precoder can include in its construction a reduction of interference. The importance of interference treatment is expected to rise with the significantly increasing user density (e.g., in 6G, user density is expected to be ten times higher than in 5G, with 10 users per square meter) and with the trend of cell sizes becoming smaller and more users located at the cell borders. The treatment of interference may also alleviate system problems related to the assignment of multiple users in a MU-MIMO system and allow for more flexible cell boundary planning. Therefore, the possible incorporation of interference treatment into precoding may offer many benefits.

Precoding is an aspect of modern wireless communication systems, playing a role in optimizing the transmission and reception of signals over physical communication channels. Precoding may fundamentally enhance the performance and reliability of wireless networks, especially in environments prone to signal degradation and interference.

An aim of precoding can be encapsulated in precoding's ability to transform the physical communication channel into an effective channel H*W. This transformation may be achieved through the application of a precoder matrix W, which may not only amplify the channel gain but also improve the no-fading statistics of the channel. This process may often be referred to as the "solidification" of the physical channel, wherein the precoder stabilizes and enhances the signal integrity.

Solidification refers to the improvement and stabilization of the physical communication channel's properties through the use of precoding techniques. In telecommunications, particularly those involving multiple-input multiple-output (MIMO) systems, the wireless channel can be highly variable and subject to various degradations such as fading, interference, and noise. These factors can significantly impair the quality and reliability of the transmitted signal.

Figure 2:
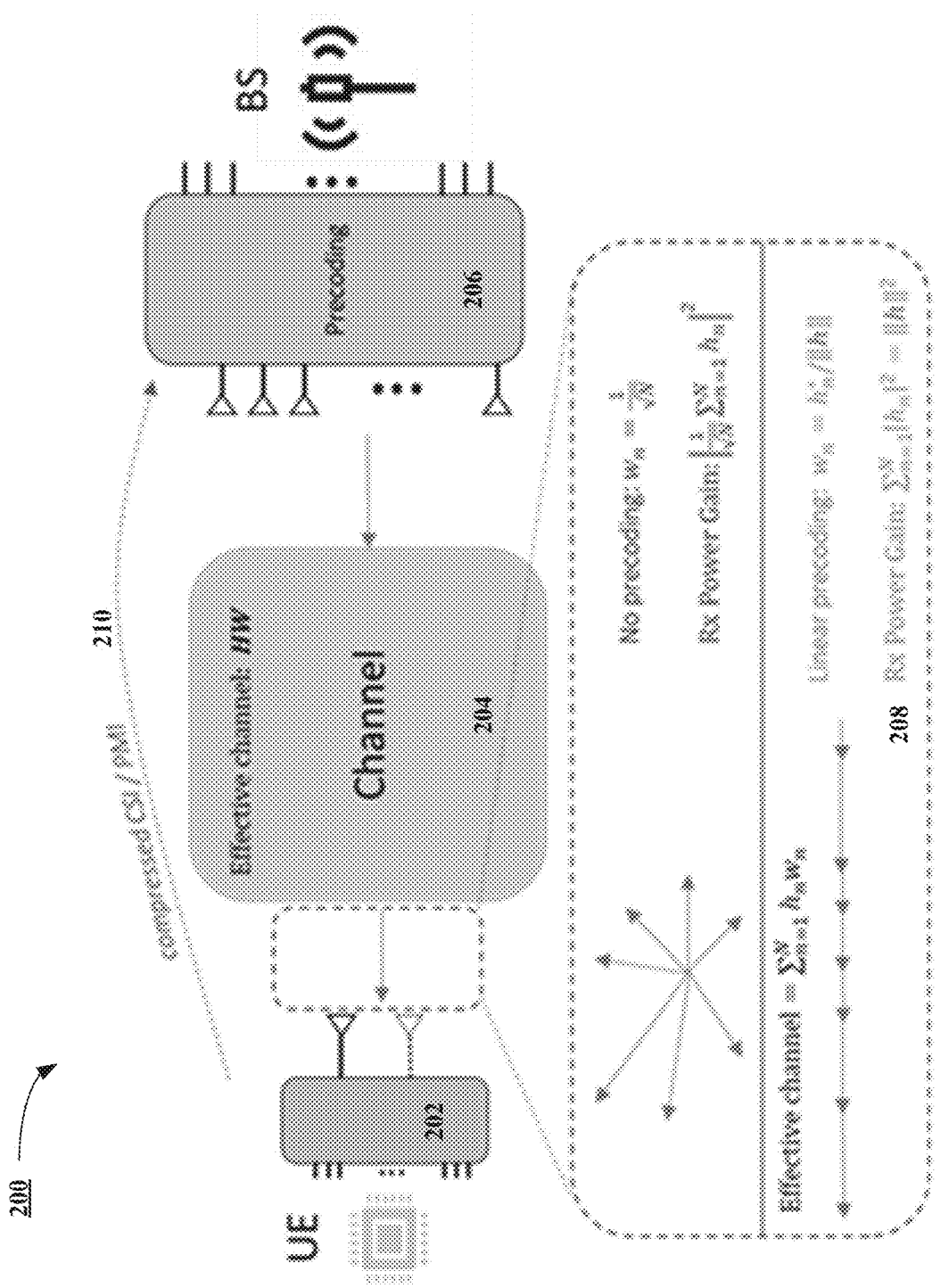
FIG. 2 is a diagram illustrating construction of Effective Channel via Precoding and its possible bettering thanks to appropriately constructed precoding.

FIG. 2 is a diagram illustrating CSI compression. As illustrated in FIG. 2, User Equipment (UE) 202 represents the starting point of the communication process. The UE 202 is typically a mobile device that collects and processes initial data and channel state information (CSI). UE 202 is responsible for encoding and initially compressing the CSI before sending the encoded and compressed CSI to base station 206 over the uplink channel 210, as indicated by the dotted line labeled "compressed CSI/PMI" in FIG. 2. Note that channel 204 is the downlink channel 204 used for transmission from the base station (BS) to the UE; the CSI is measured for the downlink channel. The downlink channel 204 symbolizes the medium through which data and CSI are transmitted from the base station to the UE. Channel 204 may include various environmental and other effects that impact the quality and integrity of the transmitted information. The CSI is transmitted from UE 202 to Base Station 206 through the uplink channel 210. Although generally, the uplink channel 210 and downlink channel 212 are different (as in FDD mode), the present invention can also be used when the uplink and downlink transmissions use the same channel (as in TDD mode). This is applicable when the UE cannot reliably use the reciprocity of the channel for the BS to perform a reliable channel estimation (e.g., due to a large distance from UE to BS or a weak channel). Thus, the CSI transmission can be utilized to deliver, in full or in part (in addition to reciprocity-based transmissions), the channel information from the UE to the BS.

Base station 206 is the receiver in this setup. Base station 206 is equipped with advanced processing capabilities, including the ability to perform precoding. This block is used for decoding the received signals and further processing the CSI for optimal transmission efficiency. Base station 206 may play a role in applying CSI compression techniques to enhance overall system performance.

Channel 204 includes an effective channel 208. Effective channel 208 is an illustrative representation of the improved state of the channel as a result of the CSI compression process. Effective channel 208 highlights the effectiveness of the channel post-processing, indicating a clearer and more reliable communication path between the UE and the base station after implementing CSI compression.

The overall layout of FIG. 2 provides a visual representation of the flow of data and processing across the components of the communication system, emphasizing the role of CSI compression in enhancing communication efficiency and reliability. The figure underscores the interconnectedness of the UE, channel, and Base Station, along with the impact of advanced processing techniques on the quality of the communication channel.

To devise an effective precoder matrix W, Channel State Information (CSI) may be obtained at the Base Station (BS). Given the voluminous nature of CSI data, the CSI data may undergo a compression process, which may typically be lossy. The initial step in this process involves generating a "template" sub-band precoder matrix at each sub-band, which may serve as the foundation for subsequent compression stages.

In some example embodiments, the proposed pre-processing method aims to facilitate CSI compression through at least one of two main strategies: (a) direct strategy, and (b) reverse strategy. The direct strategy enhances the compression of CSI to maintain efficacy despite the reduction in data size. The reverse strategy optimizes performance within the constraints of a given feedback size. An approach may also better two of these main strategies simultaneously (e.g., by maximizing a cost function which considers both the communication system performance and the compression level: this represents a mix of (a) direct strategy, and (b) reverse strategy).

Some example methods employ unitary transform matrices, including diagonal unitary matrices, to transform the original input matrices. These transformations may be applicable to various elements, such as: input signals across sub-bands (denoted as $x_n$ for sub-band n, where $N_S$ may be the total number of sub-bands).

In the context of optimizing wireless communication systems through CSI compression, our proposed method leverages sophisticated transformations to enhance the efficiency and effectiveness of signal transmission. Specifically, the method applies transformations to several key components of the system, each tailored to improve the handling and compression of channel state information across different scenarios. These components, representing the DL channel-related information, denoted as x, include: (1) precoding matrices $W_n$, (2) channel eigenvectors $v_{(l)n}$ for each layer $\ell$, and (3) transposed channel matrix columns, particularly for single-layer configurations, where they resemble eigenvectors.

In some example embodiments, the mentioned channel may be the physical channel matrix or the channel matrix after pre-processing by a linear transform which may represent the interference treatment (e.g., interference canceling or interference whitening) as is explained in further detail.

The term "DL channel-related information" encompasses a broad range of data pertinent to the downlink communication channel. This includes, but is not limited to, channel response or precoder related information such as transfer function representations, eigenvector representations, and other metrics that describe the channel state. Such information can be provided on a per sub-carrier or per sub-band basis and may also include frequency domain-based averaged information. These representations are critical for accurately capturing the channel conditions and optimizing the performance of the wireless communication system.

The precoding matrices may be used for shaping the transmitted signal at the transmitter side to counteract the effects of the channel. Each $W_n$ may corresponds to a precoding matrix for a specific sub-band n. The use of precoding matrices may help in maximizing signal strength at the receiver, minimizing interference, and effectively handling multiple data streams, especially in environments with multiple users or antenna elements.

The channel eigenvectors and related principal components of the channel matrices may be used for construction of downlink precoder for each sub-band. These eigenvectors may allow for understanding the best directions in which to transmit the signal so as to maximize signal-to-noise ratio and channel capacity. The method applies transformations to these eigenvectors to optimize them for better compression and feedback efficiency, which may be needed in systems with multiple layers or paths.

The transposed channel matrix columns refer to the application of the transformation method to the transposed columns of the channel matrix. This is particularly relevant in systems with a single layer (1-layer) where these transposed columns function similarly to the eigenvectors. The transformation helps in aligning these columns (or vectors) across different transmission instances or conditions, improving the robustness and consistency of the channel state information being fed back or utilized for system operations. This is applicable to systems with any number of layers, $\upsilon$.

In some example embodiment, the utilization of this example method may preserve the precoder's capacity to adaptively modify inputs, aligning the sets of input matrices or vectors more closely across different sub-bands. This alignment enhances the uniformity and predictability of the inputs, improving the overall system's efficiency and response to varying channel conditions.

The discussed techniques may be integral to various advanced communication standards and technologies, including: the 5G standard eType2 precoder, AI-based CSI-feedback schemes, which are gaining traction in discussions for future 6G networks, and/or both Frequency Division Duplexing (FDD) and Time Division Duplexing (TDD) schemes, underscoring the versatility of the proposed methods.

In some examples, the implementation of these precoding and compression techniques does not necessitate changes or adaptations to existing standards like the 5G framework or AI-based schemes. This ensures that they can be integrated seamlessly into current technologies, providing enhancements without disrupting established protocols. Regarding the eType2 precoder of 5G, the proposed method preserves the compression scheme and its parameters, as well as the quantization methods (for coefficients' amplitudes, phases, and the number of non-zero coefficients). It may require only a very small adaptation related to the relaxation of the protocol: allowing all non-zero compressed (and quantized) coefficients to be transmitted back, even if they are in the row of the element with the largest amplitude. This additional permission may require a single bit to be "on"; the bit can be sent together with the CSI, or (more efficiently) separately (e.g., with system information). In the latter case, it can be sent less frequently than the CSI updates. Some examples may include a modification by means of unitary matrices, general or diagonal. The bandwidth may typically be divided into $N_S$ sub-bands. Some embodiments may modify the matrix by means of unitary transform matrices and they are denoted as:

$$x_n^{(modified)} = x_n \mathbb{U}_n, \text{ for every } n = 1: N_S$$

$\mathbb{U}_n$ may be the general unitary transform. A special case of diagonal unitary matrices is:

$$\mathbb{U}_n = \text{diag}(e^{j\phi_n}), \dim\phi_n = NumberOfColumns \times 1, n = 1: N_S$$

For example, for a number of columns is three, a diagonal unitary transform may be written:

$$\mathbb{U}_n = \begin{pmatrix} e^{j\phi_{(1)n}} & 0 & 0 \\ 0 & e^{j\phi_{(2)n}} & 0 \\ 0 & 0 & e^{j\phi_{(3)n}} \end{pmatrix} \text{ for every } n = 1: N_S$$

If the sub-band input matrix per n comprises three columns $x_n = [c_{(1)}, c_{(3)}, c_{(3)}]_n$, then they are modified as:

$$x_n^{(modified)} = \left[ e^{j\phi_{(1)n}} * c_{(1)}, e^{j\phi_{(2)n}} * c_{(3)}, e^{j\phi_{(3)n}} * c_{(3)} \right]_n$$

In some designs, the DL precoder comprises a first factorization component (W1) (known or optimized separately) and the second factorization component (W2) based on the reconstructed post-processing information, with the full precoder being W=W1*W2. If no factorization is used, then W1=1 (unit matrix) and W2 is the full precoder: W=W2.

The interference treatment at UE (which knows and is able to measure the interference noise, while the BS lacks this information) can be included into the CSI. The estimated by UE physical channel can be modified by a linear transform to reject or diminish the interference as we will explain in the text. Then, the above-mentioned unitary matrix is applied not, e.g., to the original channel matrix eigenvectors but to the eigenvectors of the channel matrix which is modified by this interference treating transform. These eigenvectors (or constructed precoder) are further compressed and delivered to the BS seamlessly (via CSI-compression mechanism) as the post-processing information.

The integration of a scheme (AI or Classical) that learns from the modified input enhances the scheme ability to compress CSI more effectively since the data parts become more similar after modification. Also, if AI scheme is used, then learning and re-learning of neural network parameters is accelerated due to reduced diversity of the data.

Preprocessing (modification by means of a unitary matrix) facilitates the above-named compression, or for a given compression level it betters the communication system performance or performs these goals simultaneously. The trade-off due to better performance may also include reduction in the number of (AI) scheme parameters (e.g., NN (Neural Network) weights).

The unitary matrix preprocessing can be optimized to achieve the above goals. Also, importantly, a unitary modification can be used to set initial parameters for artificial intelligence/machine learning (AI/ML) algorithms, facilitating faster learning and re-learning. This is important for time-variable channels (and/or variable interference when it is incorporated into the CSI) and in general for operations in changing environment (hence for large variety of applications related to UE movement, UE on vehicles or trains, or to a swarm of moving robots or their communicating parts) where the ability of faster learning and re-learning is essential and it may compensate in part and fight the channel ageing. Also, better accuracy may facilitate less frequent DL precoder update.

Figure 3:
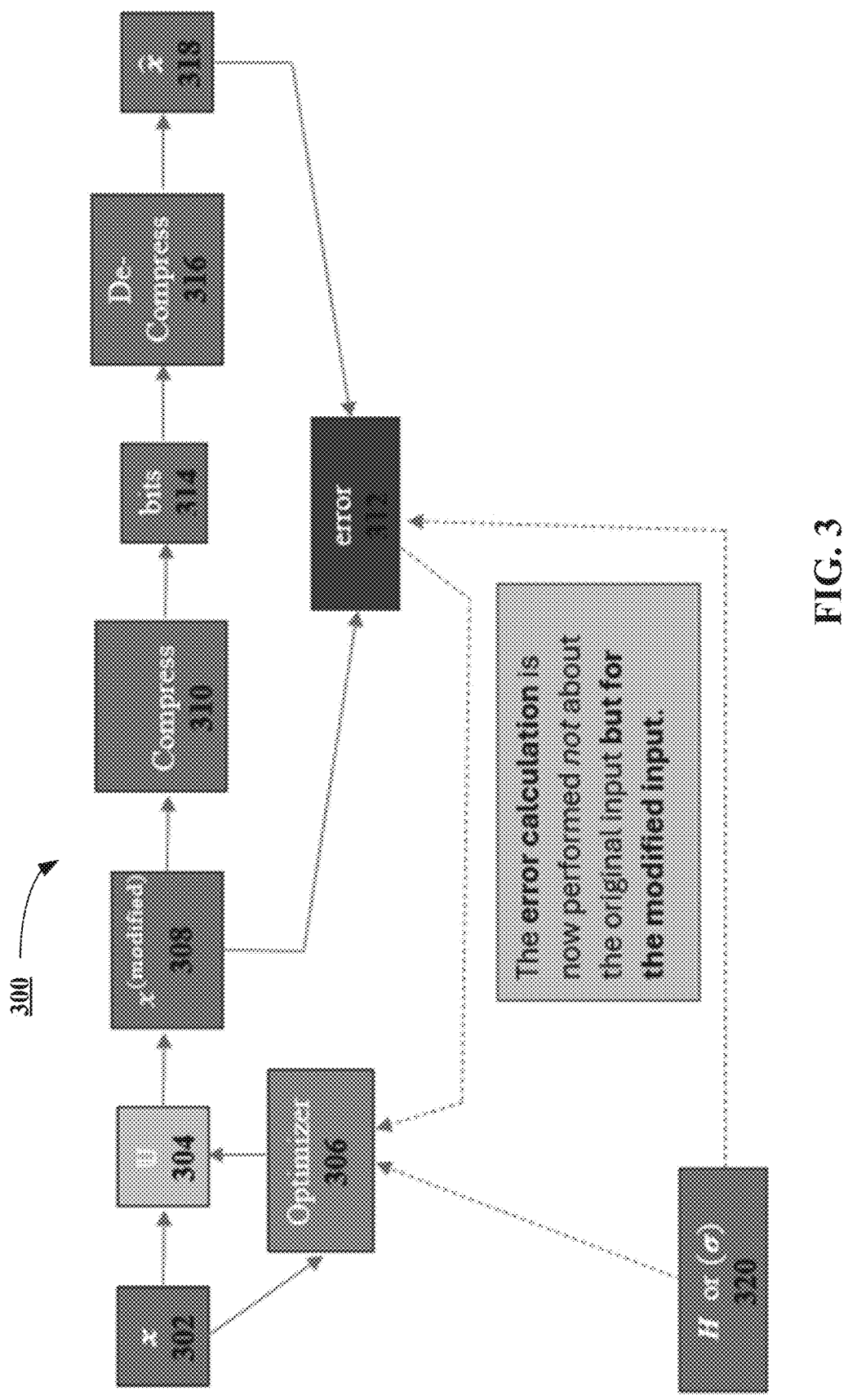
FIG. 3 is a diagram illustrating that Compression may be Classical (e.g., alphabet based) or Compress/De-Compress may be AI-based (e.g., Neural Network with weights) and also illustrating the proposed input modification by means of Unitary Matrix; the reconstruction error is calculated not about the original input (as in the Prior Art) but about the modified input (as proposed in this invention).

FIG. 3 is a diagram illustrating that Compression may be Classical (e.g., alphabet based) or Compress/De-Compress may be AI-based (e.g., Neural Network with weights). FIG. 3 presents a comprehensive diagram that illustrates the innovative approach to CSI compression which can be executed through either classical (alphabet-based) or AI-based (neural network with weights) methods. This dual strategy may enable a versatile application in different system architectures.

Compression Techniques:

Classical Compression utilizes traditional methods such as alphabet-based encoding which are straightforward but may lack flexibility in handling complex patterns or dynamic changes in the channel state. AI-based Compression employs a neural network model that adjusts its weights based on the input data, allowing for more sophisticated and adaptive compression strategies. AI-based Compression can significantly reduce the feedback bits needed while maintaining or enhancing performance.

Modification Objectives:

In one example embodiment, an aim may be to reduce the number of feedback bits needed for achieving the same or better performance than previous systems. Alternatively, in another example embodiment, the number of bits may be preserved, and the goal may be to enhance the overall performance of the communication system. In other embodiments, some combination of reducing the number of feedback bits needed and enhancing the overall performance of the communication system may be the goal.

In one example embodiment, the approach may introduce significant innovations by optimizing modification parameters which were not actively optimized in previous systems. The optimization of these parameters may yield performance improvements, averaging around 1 dB and reaching up to 2 dB in more complex scenarios such as, for example, 3-layer systems and 4-layer systems.

Prior systems may typically employ a rigid, non-optimal approach focused on dephasing the strongest beam row, which may be inadequate in multipath environments where several beams are significant. However, these prior systems may be adequate for restricted and non-general cases, such as Line of Sight (LOS) propagation, where only a single beam is present.

Advanced Strategies:

In some example embodiments, a more general method of column synchronization has been developed, utilizing an Auxiliary Synchronization Vector (ASV) that is more complex than the simple delta-like vector used in prior systems.

Multiple strategies for constructing the ASV are proposed, each potentially leading to different performance enhancements.

In some example embodiments, the proposal may include continuous-based optimization of the ASV and may use these strategies as a basis for further refinement through optimization algorithms, e.g., gradient descent or Artificial Intelligence/Machine Learning (AI/ML)-based methods.

AI/ML Integration:

FIG. 3 encapsulates these concepts in a visual format that outlines the dual compression pathways (Classical and AI-based), showcases the modification techniques, and illustrates the comprehensive system improvements enabled by some example embodiments. The diagram 300 highlights the integration of an AI model that learns from the modified input, which may enhance the AI model's ability to compress CSI more effectively due to the reduced diversity of the data and accelerated learning of neural network parameters.

Error Calculation and Optimization:

In some example embodiments, the error functions used in the AI-based schemes may be refined to focus not just on the reconstruction error but also on communication-specific criteria such as capacity maximization, marking a significant shift from traditional methods.

Physical and Modified Channel Handling:

In some example embodiments, the system may also include an approach to construct the precoder based not just on the physical channel but on a modified channel that accounts for interference treatment, which generalizes existing solutions and better accommodates the complexities of MU-MIMO environments.

As illustrated in FIG. 3, an input x, block 302, may be input to a unitary matrix block 304 as well as an optimizer 306, the output of which is also input to the unitary matrix block 304 to generate a modified input, $$x_n^{(modified)}$$

308. The $$x_n^{(modified)}$$

308 is output to compress block 310 and also output to the error block 312. The bits 314 may then be decompressed 316 and then $$\hat{x}_n^{(modified)}$$

may be generated from the compressed modified input bits. The output of the block 318 for $$\hat{x}_n^{(modified)}$$

is also an input to error block 312. The error block 312 also includes an input from block 320 (H or (σ)). Thus, the error calculation may be performed not on the original input, but rather on the modified input. Note that the error (block 312) may also be used as an additional input to the optimizer (block 306). This may help to guide the optimizations toward further error reduction. The dashed lines in FIG. 3 represent optional connections (between blocks).

Some prior systems may use an Auxiliary Synchronization Vector (ASV) approach for phasor construction and optimization and some prior systems may use a simplistic ASV with a single non-zero component. For example, some prior systems propose to scale the columns of the template matrix (i) per layer $$P_{(\ell)}^{(template)}$$

and (ii.) in a very specific way: subtracting form phase of each column elements the phase of the row corresponding to the "most significant beam" which is the row containing the maximal amplitude of the matrix element:

Let $[k_*^{(\ell)}, \sim] =$ $$\underset{k,n}{\mathrm{argmax}}|P_{(\ell)}(k, n)| \text{ then } P_{(\ell)}^{(template\ scaled)}(k, n) = \frac{P_{(\ell)}^{(template)}(k, n)}{e^{j*phase\left(P_{(\ell)}^{(template)}\left(k_*^{(\ell)}, n\right)\right)}}$$

where $$k_*^{(\ell)}$$

marks the row of the "most significant beam."

Some prior systems use a simple and straightforward process. For example, one prior art system is based on the "strongest" beam speculative idea. From the technology developing view, one may see that a prior system implicitly tries to preserve in part the Type 1 (of 5G) philosophy based on one best beam-approach, using it here for phase synchronization.

For the restricted special case when there may only a single beam per layer, the approach may be optimal, since there would be a single non-zero row in the precoding matrix. However, in many wireless environments multiple beams can be needed and the strongest beam loses its dominance. Then the simple approach may still lead to improvement about the no-processing input, but the simple approach becomes non-optimal. This is seen from examples, where the improvement gaps are presented (for 4 layers the max shown gap (hence the algorithm inefficiency) may be ~2.1 [dB], while the mean gap is ~1 [dB], larger gaps may be possible with furthermore refined optimization tools).

As will be described herein, in FIGS. 4, 5, 6, 7, 8 and 9 the compression (after the preprocessing) may be done according with the eType2 parameters L=6, $N_S$=19, p=¼, β=¾ (the above values of $N_S$ and p lead to usage of $\lfloor 19*p \rfloor$=5 FFT coefficients per every layer). The only difference with eType2 is that no restriction is placed on reporting coefficients (including the row of the strongest coefficient).

In the FIGS. 10, 11, 12, 13 and 14 the compression (after the pre-processing) may be done according with the eType2 parameters L=4, $N_S$=19, p=¼, β=¾ (the above values of $N_S$ and p lead to usage of $\lfloor 19*p \rfloor$=5 FFT coefficients per every layer). While in these figures the eType2 restriction on the reporting of the strongest row per layer coefficient is fully respected for the Prior Art, depicting the eType2 precoder, it is not placed with the proposed approach.

Figure 4:
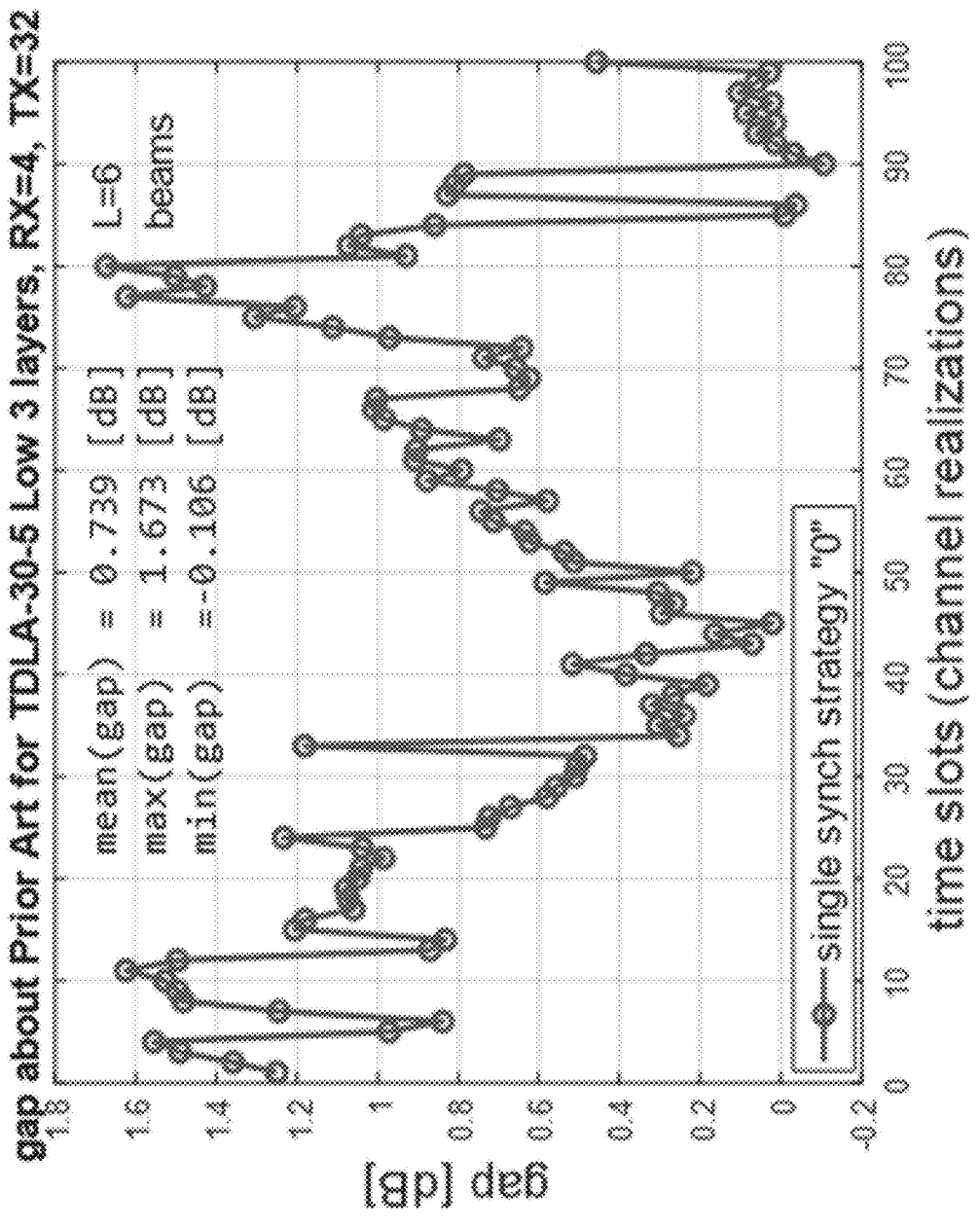
FIG. 4 illustrates a graph of gap in dB versus time slots for a single synchronization strategy ("0") for three layers where the strategy "0" is based on synchronization about the averaged correlation matrix eigenvector which is used as auxiliary synchronization vector (ASV).
Figure 5:
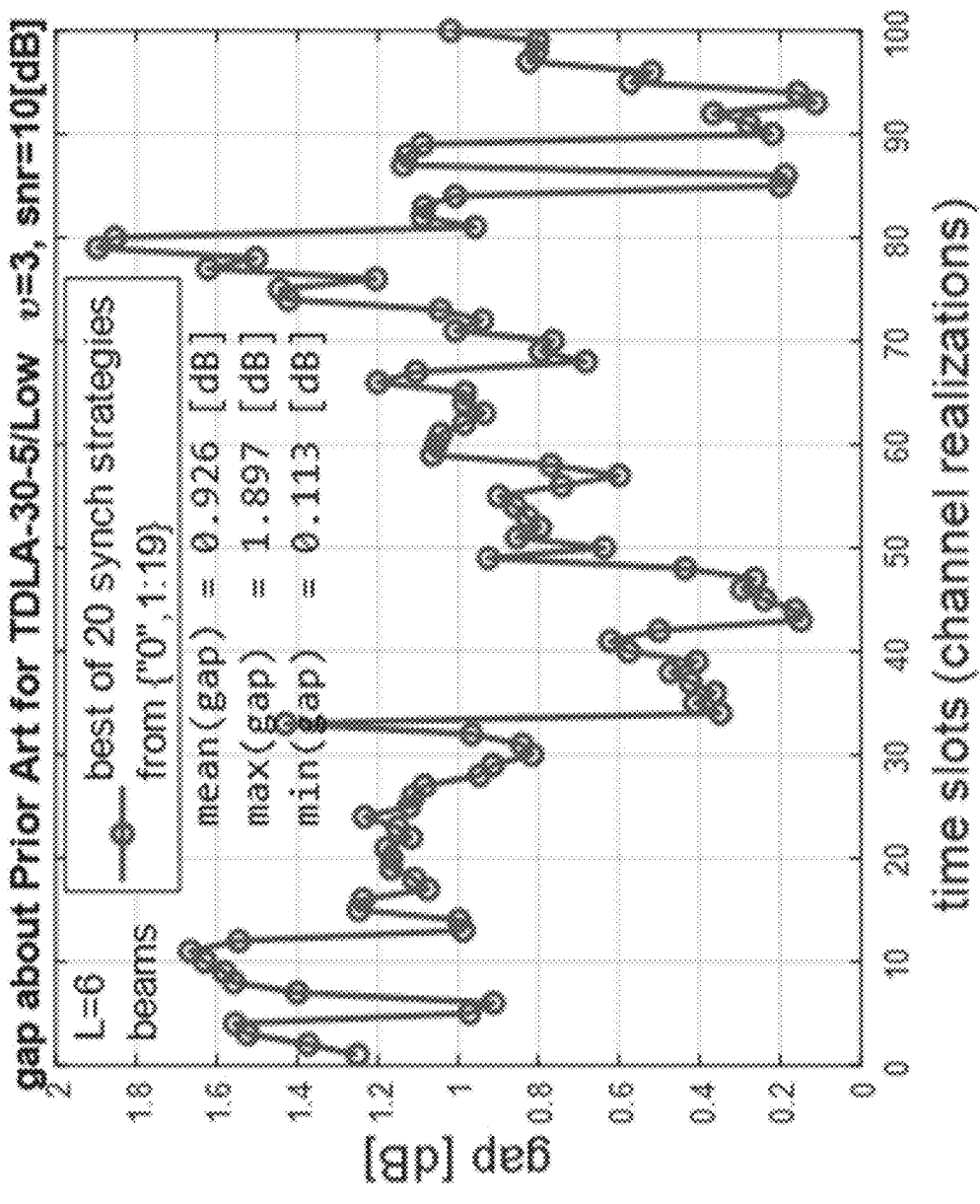
FIG. 5 illustrates a graph of gap in dB versus time slots for 20 synchronization strategies ["0"+19 columns] for three layers where the strategy "0" is based on synchronization about the averaged correlation matrix eigenvector, while for strategy "k" it is about the column number k; these vectors are then used as auxiliary synchronization vector (ASV).
Figure 6:
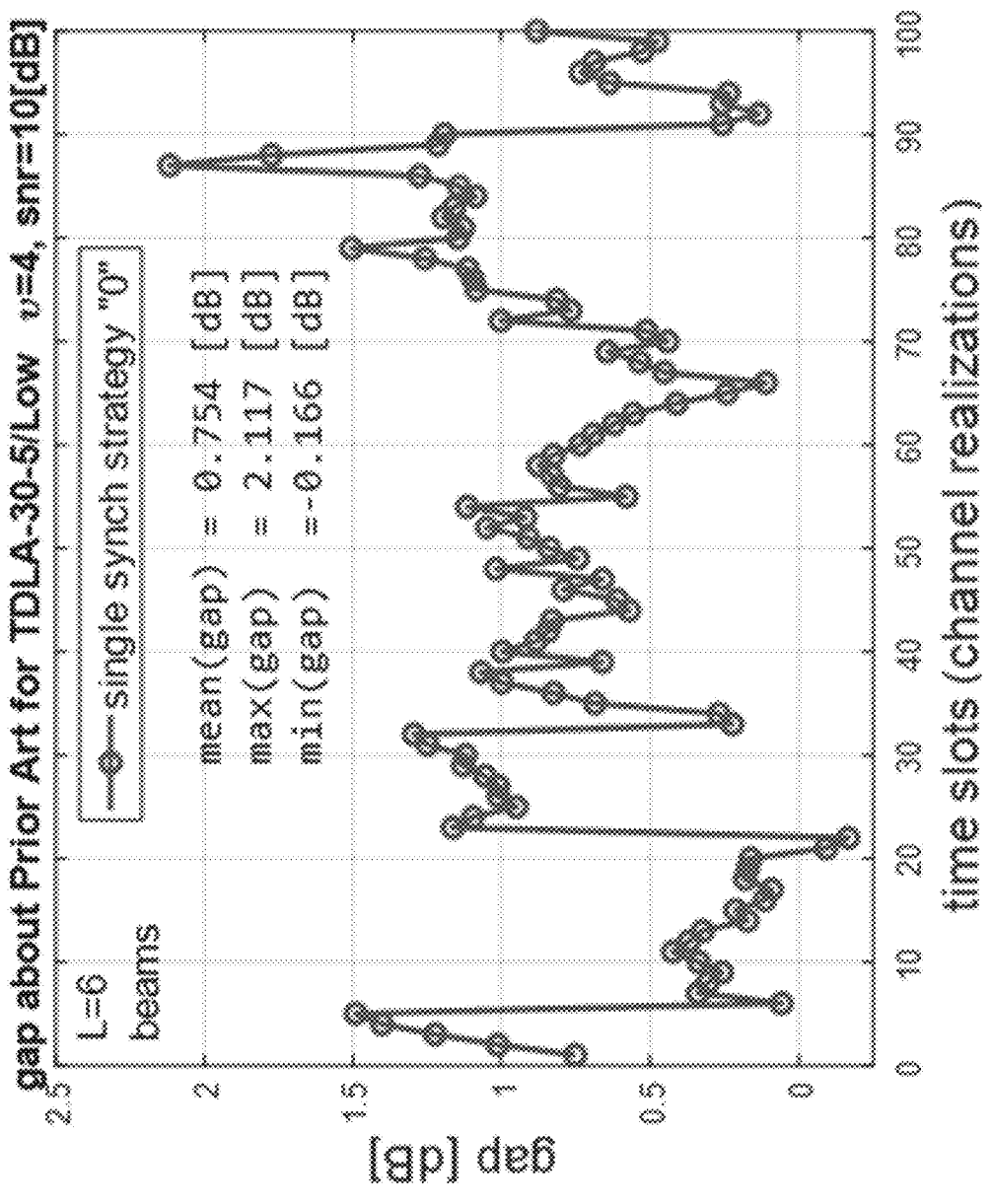
FIG. 6 illustrates graphs of gap in dB versus time slots for a single synchronization strategy ("0") for four layers where the strategy "0" is based on synchronization about the averaged correlation matrix eigenvector which is used as auxiliary synchronization vector (ASV).
Figure 7:
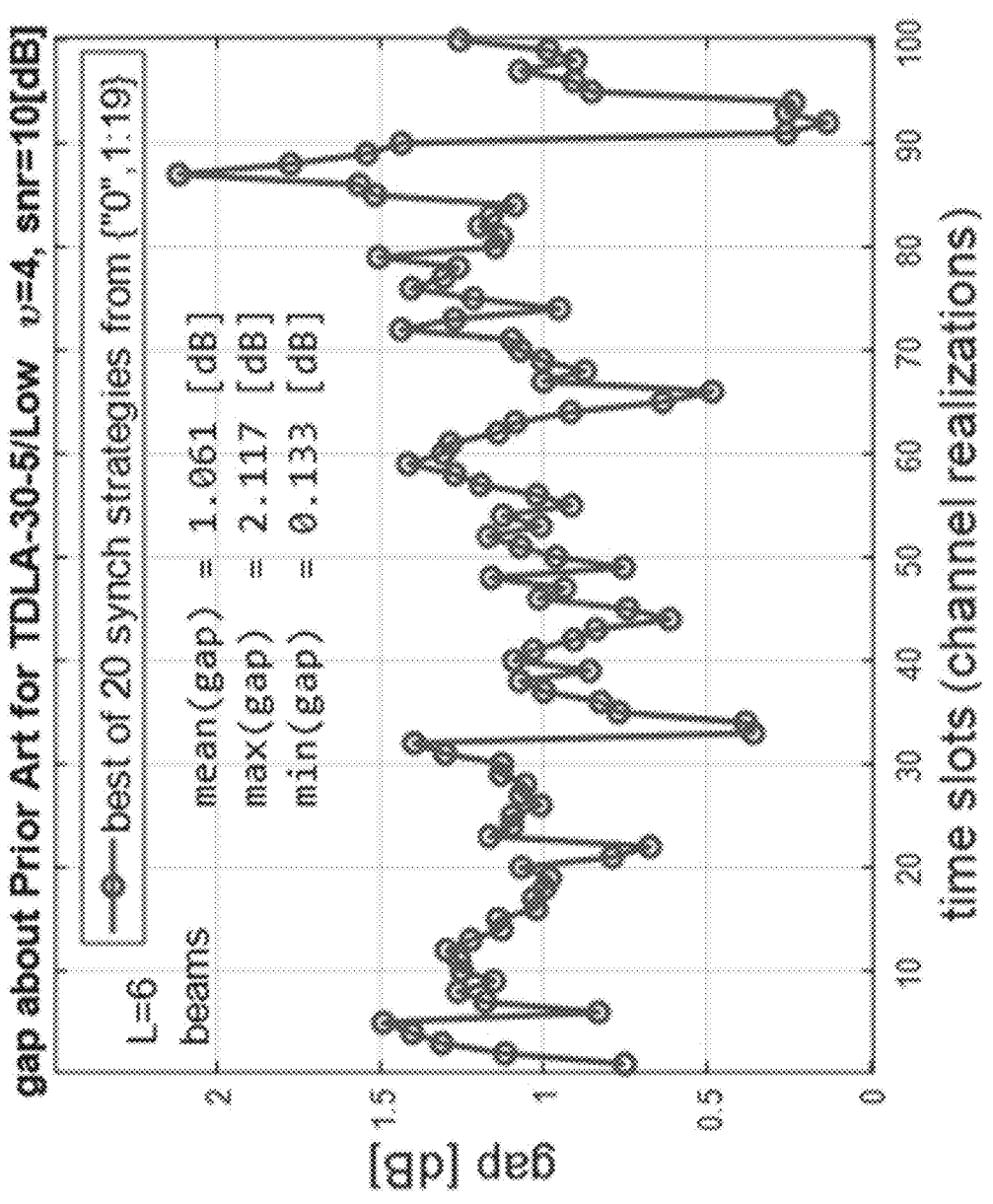
FIG. 7 illustrates a graphs of gap in dB versus time slots for 20 synchronization strategies ["0"+19 columns] for four layers where the strategy "0" is based on synchronization about the averaged correlation matrix eigenvector, while for strategy "k" it is about the column number k; these vectors are then used as auxiliary synchronization vector (ASV).

For example, FIG. 4 illustrates a graph of gap in dB versus time slots for a single synchronization strategy and FIG. 5 illustrates a graph of gap in dB versus time slots for 20 synchronization strategies ["0"+19 columns], each for three layers. While FIG. 6 illustrates a graph of gap in dB versus time slots for a single synchronization strategy and FIG. 7 illustrates a graph of gap in dB versus time slots for 20 synchronization strategies ["0"+19 columns], each for four layers. The gap[dB]>0 for each time slot. (Here, the strategy "0" is based on synchronization about the averaged correlation matrix eigenvector, while for strategy "k" it is about the column number k; these vectors are then used as auxiliary synchronization vector (ASV) as it is explained further). The performance of a system using multiple synchronization strategies becomes more robust with selection over additional strategies. Comparison of the systems and methods described herein, and the prior art spectral efficiency averaged by the number of layers (calculated at time slot 1, better performance and flatter (robust) behavior has been observed in FIG. 8.

Figure 8:
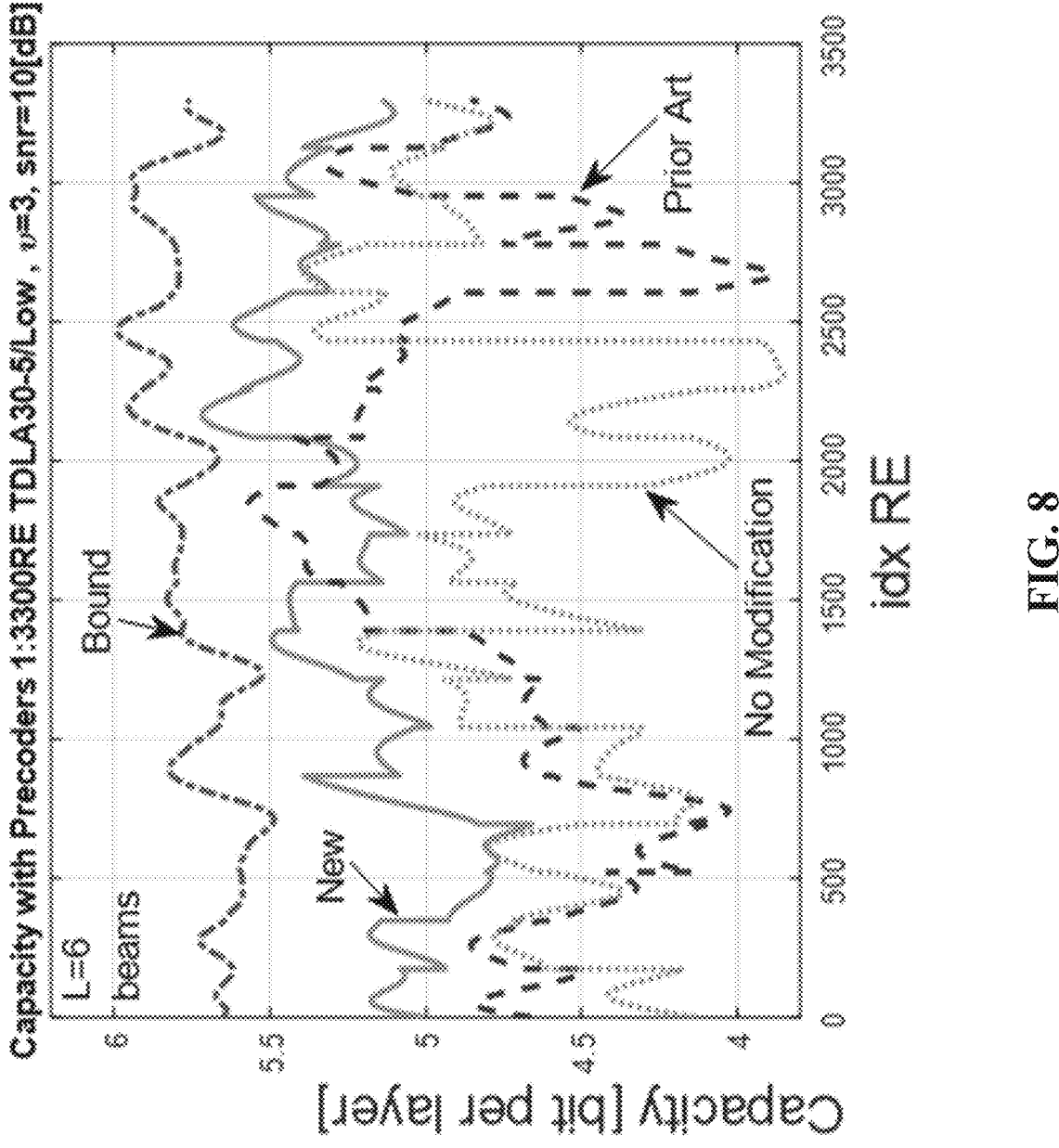
FIG. 8 illustrates graphs of capacity in bits per layer versus idx RE (Resource Element index) for three layers.

FIG. 8 illustrates a graph of capacity in bits per layer versus idx RE (Resource Element index). The capacity is averaged over 3 information streams at every RE in the 100 MHz spectrum (the size of RE is 30 kHz and 3300 REs are shown). The comparison is for L=6 beams design. The quantization follows eType2 rules, but all non-zero compressed matrix coefficients are reported and this includes also the non-zero coefficients presented in the strongest beam row. The total number of the non-zero coefficients is identical for the Prior Art and the New design. The New design has clearly superior performance than the Prior Art. The bound is the SVD bound calculated for L=6 beams. (Note that gap in bits may be translated to gaps in dB (presented in the previous figures) as: gap_dB=3*gap_bits).

As discussed above, FIG. 8 illustrates a graph of capacity in bits per layer versus idx (index of) RE (the presented bandwidth is 100 MHz with REs occupying 30 kHz spacing each hence an OFDM symbol has $$\frac{100*10^6\,[\text{Hz}]}{30*10^3\,[\text{Hz}]} \approx 3300$$

[RE] shown in the FIG. 8). The graph includes four curves for systems that are capacity bound, new, prior art, and with no modification. The number of communication layers is 3 ($\upsilon$=3), and the shown capacity is the total capacity sum which is averaged over three layers (i.e., the sum of capacities of all three layers divided by 3).

Some prior art approaches "synchronize" specific-single-row components of the precoder matrix (based on eigenvectors, which are up to phasor) only. However, such an approach does not synchronize the column vectors. When every column vector is an eigenvector of the sub-band correlation matrix, then how may these column vectors be made to have something in common? A heuristic (and as illustrated in the Figures above better performing) approach may be to synchronize multiple columns of the sub-band precoders with the single (per layer) column of the wideband precoder. This may lead to synchronization of sub-band eigenvectors (representing the input to compression) with the eigenvector of the averaged correlated matrix (per layer). This may be referred to as "strategy" 0. Another strategy may be to synchronize all columns toward a selected column (in general there may be $N_S$ such selections per layer). This may be referred to as "strategies" 1:$N_S$. Heuristically and if number of strategies (to use or to try) is restricted one may use a column in the center of the bandwidth (e.g., with index $\lfloor N_S/2 \rfloor$, which for $N_S$ being odd gives a median index form the 1:$N_S$ interval, or nearby indices).

Figure 9:
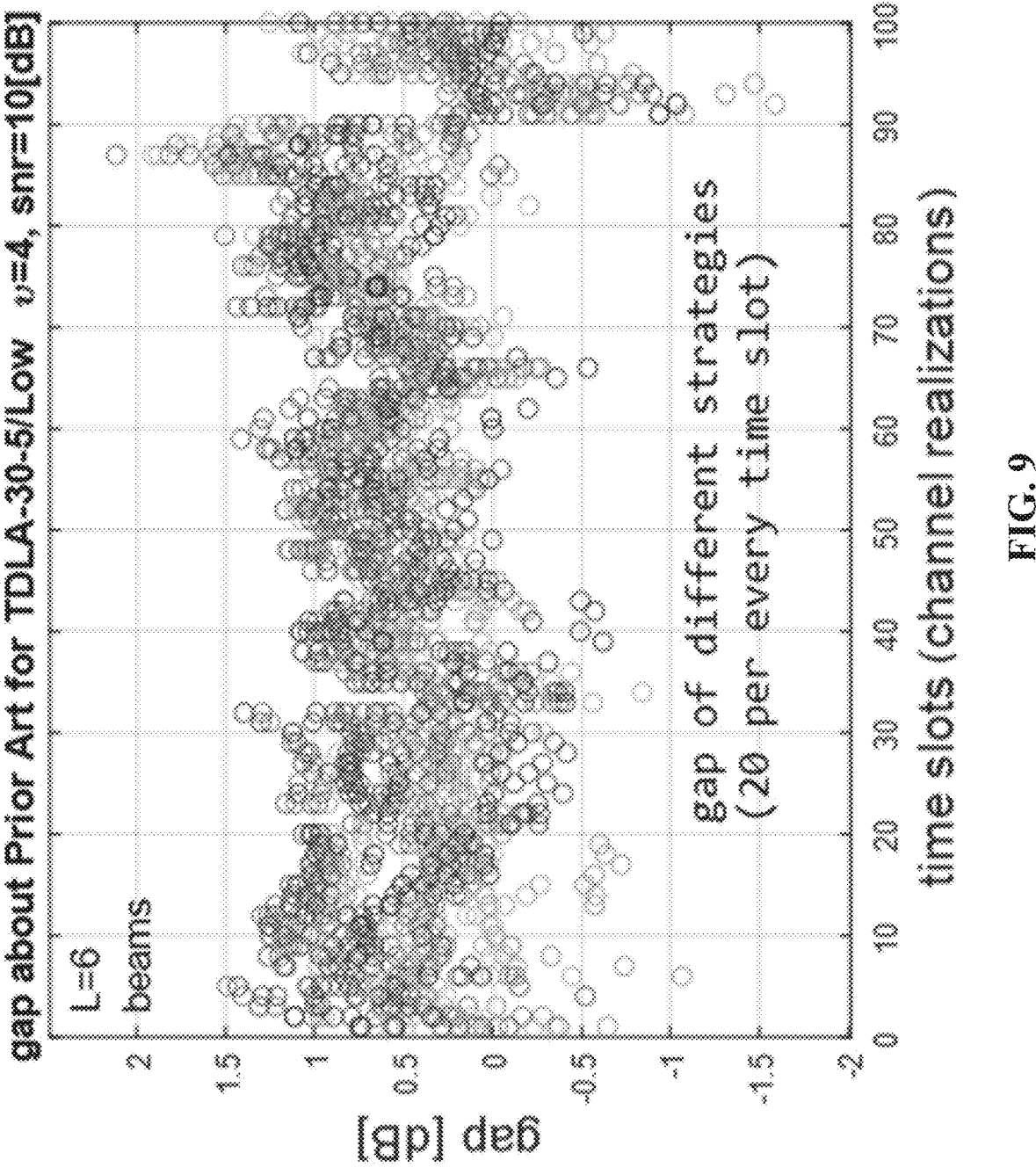
FIG. 9 illustrates a graph of gaps [dB] versus time slots for 20 synchronization strategies for four layers.

FIG. 9 illustrates a graph of gap [dB] versus time slots. Gaps of 20 column synchronization strategies 0:19 are presented for 100 time-slots. For every strategy, a cost function may be calculated (e.g., capacity or average power over antennas, or cosine similarity of the NN (Neural Network) output with its modified input), and the best strategy may be selected. This approach may include any construction of the compressor and decompressor (including coefficient quantization effect). In some example embodiments, another approach may be to synchronize about the SVD decomposition of the sub-band precoder matrix best left "u" eigen-vector/s (having length of the column, we will explain this further, "best" means corresponding to the largest eigen-value). The input 2D matrix $x_n$ at every sub-band n has $\upsilon$ 1D columns (column vectors) $x_{(\ell)n}$ corresponding to the $\upsilon$ total information layers $$x_n = [x_{(1)n}, \dots , x_{(\upsilon)n}]$$

The phasors (unit-amplitude complex numbers) which may modify the input matrix $\upsilon$ columns:

$$x_{(\ell)n}^{(modified)} = x_{(n)\ell} * \phi_{(\ell)n}, \; |\phi_{(\ell)n}| = 1$$

can be constructed by means of the auxiliary synchronization vector (ASV) $a_{(l)}$ (the same for every column n=1:$N_S$, but it can be different for different layers $\ell$ ).

$$\phi_{(\ell)n} \equiv \frac{x_{(\ell)n}^H a_{(\ell)}}{|x_{(\ell)n}^H a_{(\ell)}|},$$

The modification of the input matrix columns may, thus be explicitly presented by means of ASV approach for column synchronization by using presented equation which separately per layer $\ell$ modifies $N_S$ columns $x_{(n)\ell}$ of the inputs $x_{(n)}$ as:

$$x_{(\ell)n}^{(modified)} = x_{(\ell)n} \frac{x_{(\ell)n}^H a_{(\ell)}}{|x_{(\ell)n}^H a_{(\ell)}|}$$

for columns n=1:$N_S$ (per layer $\ell$ =1:$\upsilon$) (EQUATION "Aux. Synch. Vec")
e.g., for columns n=1:19 (per layer $\ell$ =1:4)

One can check by direct substitution that the modified input (defined by (EQUATION "Aux.Synch.Vec")) leads to the angle synchronization of the scalar products with the auxiliary vector:

$$\text{angle}\left(x_{(\ell)n=1}^{(modified)H} a_{(\ell)}\right) = \dots = \text{angle}\left(x_{(\ell)n=N_S}^{(modified)H} a_{(\ell)}\right) \text{ for } \ell = 1: \nu$$

This vector may be optimized as a continual vector or be represented by a strategy. Here, $a_{(\ell)}$ for strategy "0" is the eigenvector (corresponding to the layer, $\ell$ ) of the averaged correlation matrix, namely $a_{(\ell)} = e_{(\ell)}$, where $\langle C \rangle e_{(\ell)} = \lambda_{(\ell)} e_{(\ell)}$ and $\langle \dots \rangle$ denotes averaging see the details and definition of C further).

The auxiliary synchronization vector usage is just an approach to the general optimization of the phasors of the diagonal unitary matrix. It brings the advantage of physical meaning of the synchronization. The components of the "auxiliary" vectors $a_{(\ell)}$ can be optimized as continuous variables. It may be especially effective when $\overline{N}_T < N_S$. (the definition of $\overline{N}_T$ will be presented further, and for the simplest case of no precoder factorization it is equal to the number of TX antennas of the Base Station, or be e.g., twice the number of "beams" used in 5G for two polarizations simultaneously, (e.g., $\overline{N}_T = 12$ for 6 beams, or $\overline{N}_T = 8$ for 4 beams)).

Alternatively, and directly, the "auxiliary" vectors $a_{(\ell)}$ can be constructed from "strategies" and the best-performing one can be selected:

$$a_{(\ell)}^{(selected)}.$$

This combinatorial approach automatically considers also the quantization effect (which are otherwise are difficult to tackle).

The best "strategy" solutions may be (optionally) utilized as the seed of these more general, (e.g., continuous) optimizations.

The prior art approach is a particular case of our more general approach. One example synchronizes columns by means of a particular auxiliary vector, representing a specific "delta" strategy:

$$a_{(\ell)}^{(prior\ art)}(k) = \delta_{k_*^{(\ell)},k} \text{ for } k = 1:\ 2L$$

For example, if the strongest beam has index "3" and there as 4 beams (hence the column has length of 2*4=8, where 2 is due to 2 polarizations in 5G), then the auxiliary vector is:

$$a_{(\ell)}^{(prior\ art\ Nokia)} = \begin{bmatrix} 0 \\ 0 \\ 1 \\ 0 \\ 0 \\ 0 \\ 0 \\ 0 \end{bmatrix},$$

illustrative for specific case $$k_*^{(\ell)}$$

=3 of the strongest beam

In FIGS. 4, 5, 6, 7 and 8 the compression compares the input synchronization done in the Prior Art about the strongest beam and about the strategies "0" or "0" and 1:19; the compression is done as in eType2 (including the $K^{NZ} = 2*K_0$ demand on non-zero coefficients. The parameter is explained further, below.) The first distinction is that all non-zero coefficients are reported including those which are in the strongest beam row index (when they occur as non-zero). A second distinction from the 5G eType2 is, as presented, results for L=6 beams for 3 and 4 layers (note that the bound in FIGS. 8A-8B also corresponds to the SVD bound for L=6 beams), while only up to L=4 beams are allowed by the 5G standard for 3 and 4 layers.

Now, comparing the newly proposed method with the exact version of the eType2 standard and it will demonstrate the superiority of the new proposed approach. Consider L=4 beams and settings of $N_S = 19$ sub-bands and parameters "p" and "β" be as allowed in eType2: $p = \frac{1}{4}$ and $\beta = \frac{3}{4}$. For the Prior Art the synchronization about the strongest beam is performed. Additionally, a heuristic amplitude modification of the input is presented: the strongest beam row is input elements are resubstitute they amplitude actual values by the value of the strongest element (per layer). This irreversible warp changes the amplitudes with no relation to the actual values, but this may be done to forcibly make values be similar and even identical after dephasing. This approach leads, after dephasing of the strongest beam warped (amplitude forcibly modified) row, to a row containing identical values. Then the following Fourier transform of this row leads, for the Prior Art, to a direct current (DC), e.g., zero frequency coefficient and all other coefficients be zeros (hence, with this amplitude warping) has no need to be reported.

Figure 10:
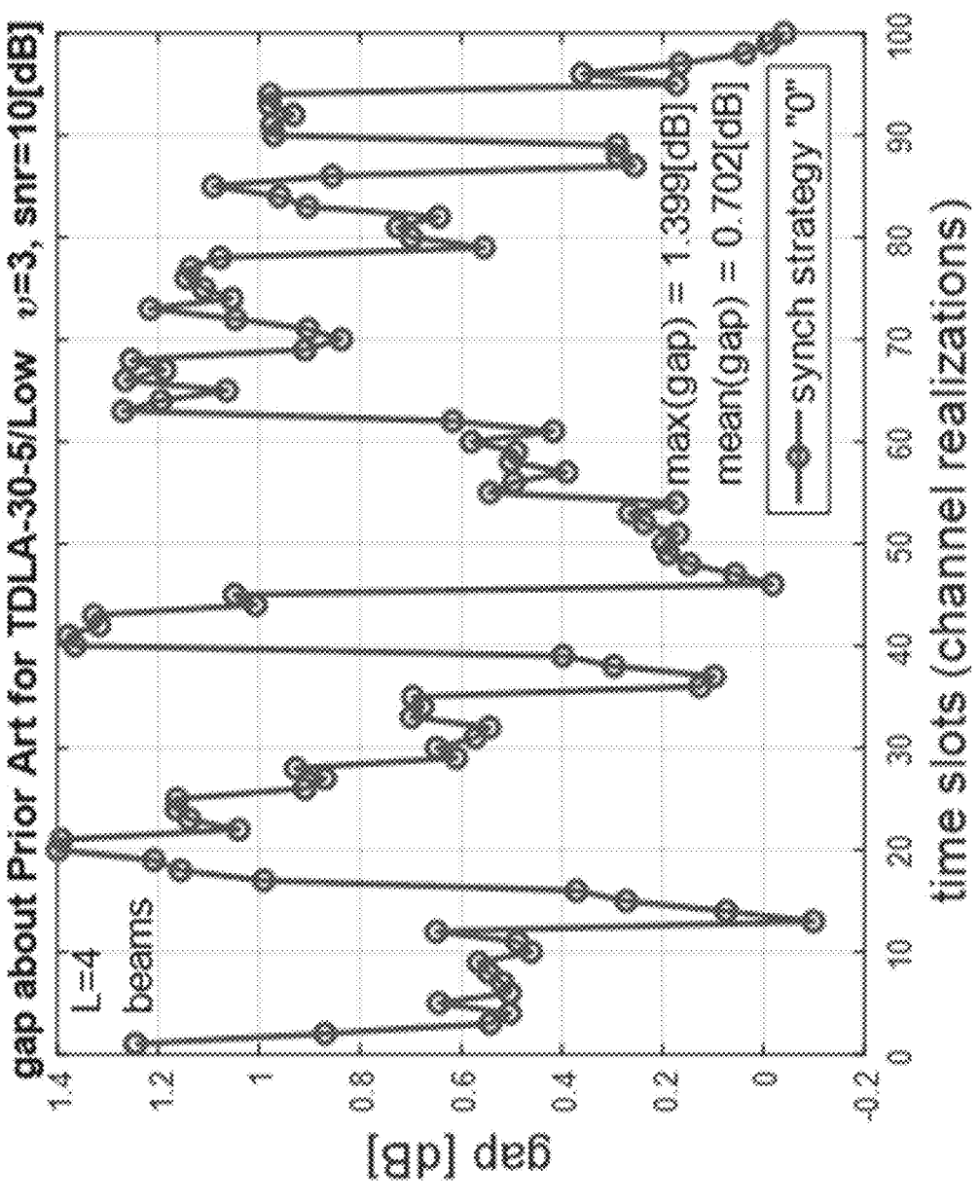
FIG. 10 illustrates a graph of gap in dB versus time slots for a single synchronization strategy ("0") for three layers, where the comparison is for L=4 beams design (as allowed in eType2).
Figure 11:
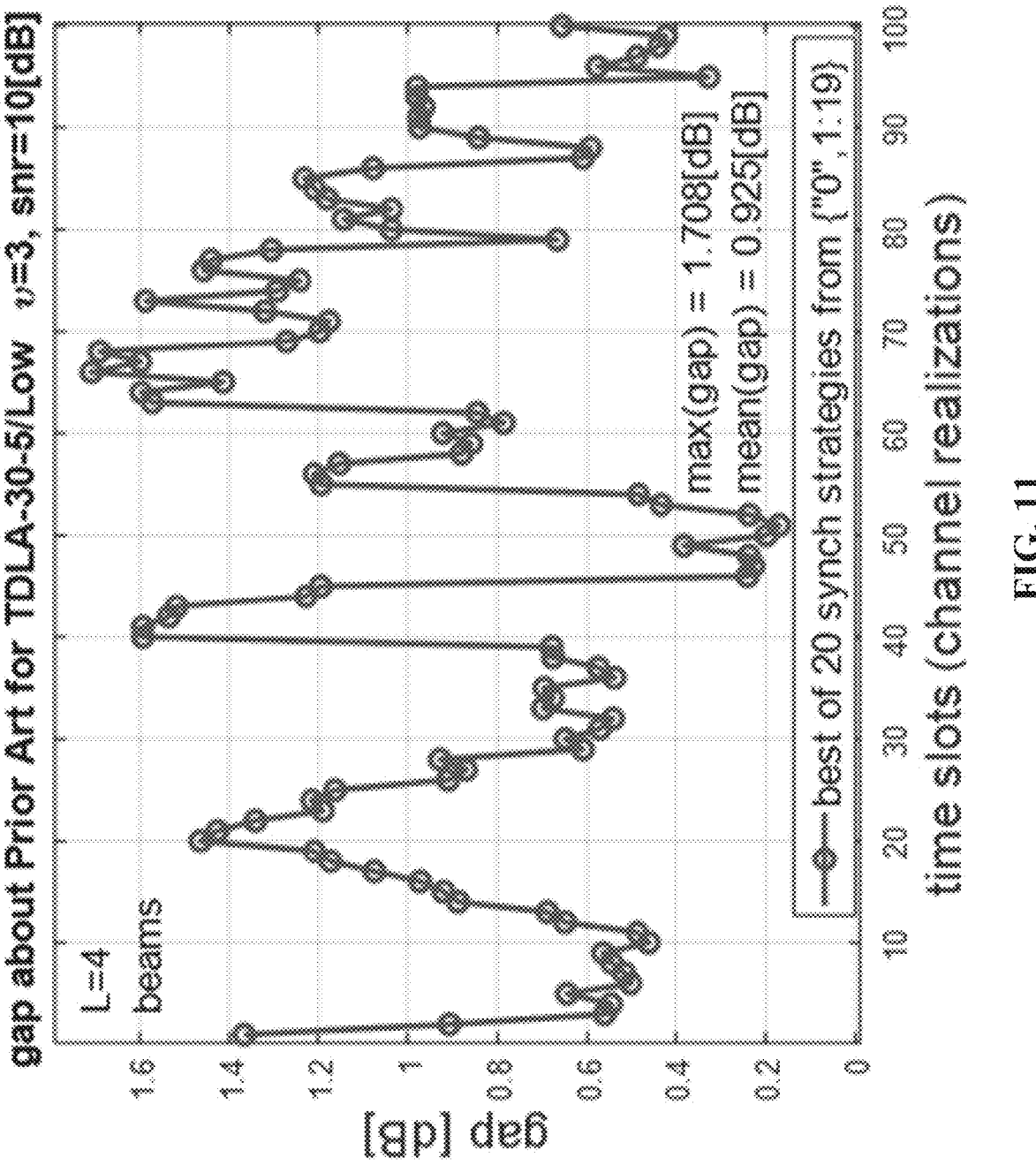
FIG. 11 illustrates graphs of gap in dB versus time slots for a 20 synchronization strategies ["0"+19 columns] for three layers, where the comparison is for L=4 beams design (as allowed in eType2).
Figure 12:
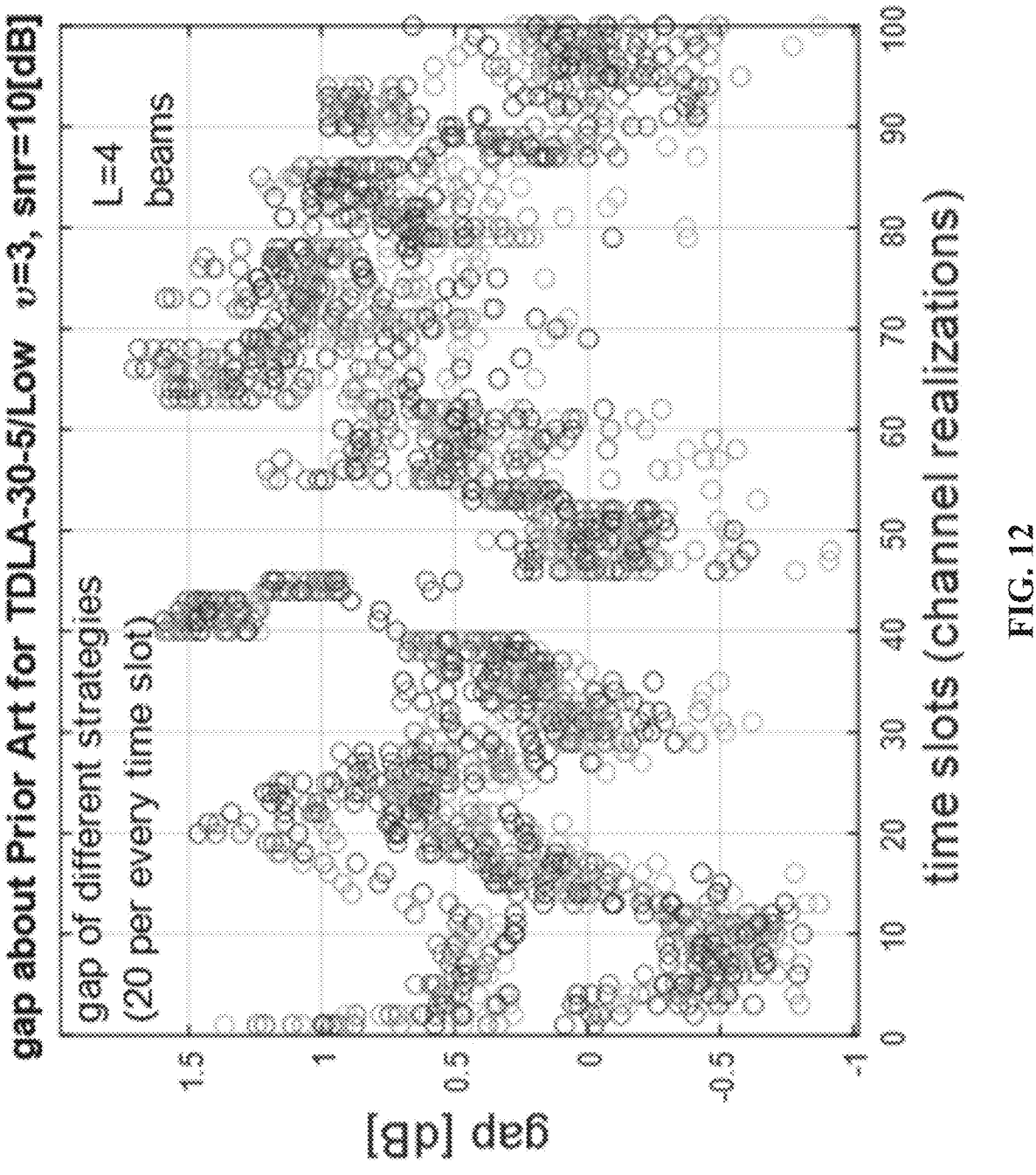
FIG. 12 illustrates graphs of gaps [dB] versus time slots for 20 synchronization strategies. The comparison is for L=4 beams design (as allowed in eType2), where the comparison is for L=4 beams design (as allowed in eType2).
Figure 13:
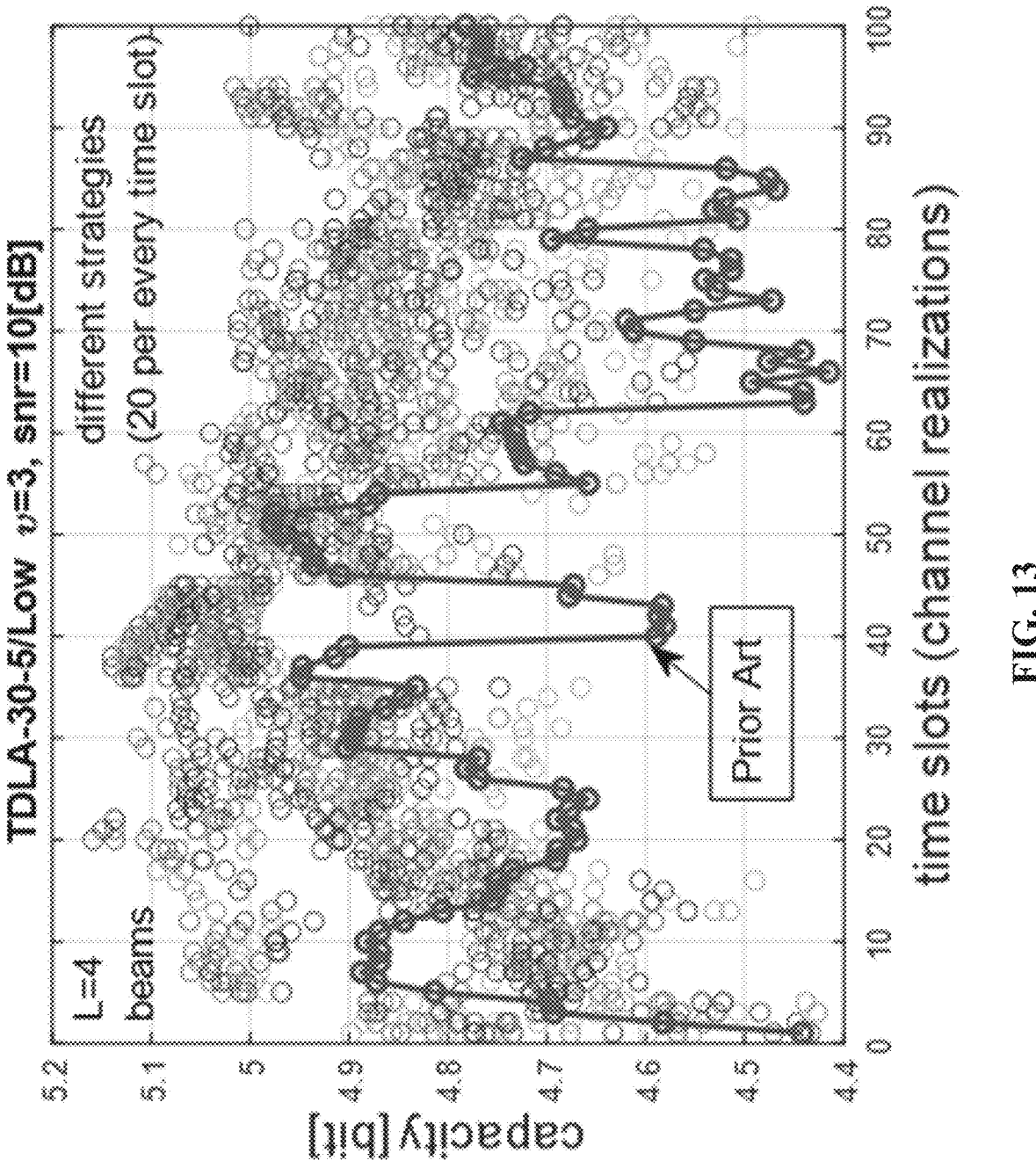
FIG. 13 illustrates graphs of capacity [bit] versus time slots for 20 synchronization strategies and for the prior art, where the comparison is for L=4 beams design (as allowed in eType2).
Figure 14:
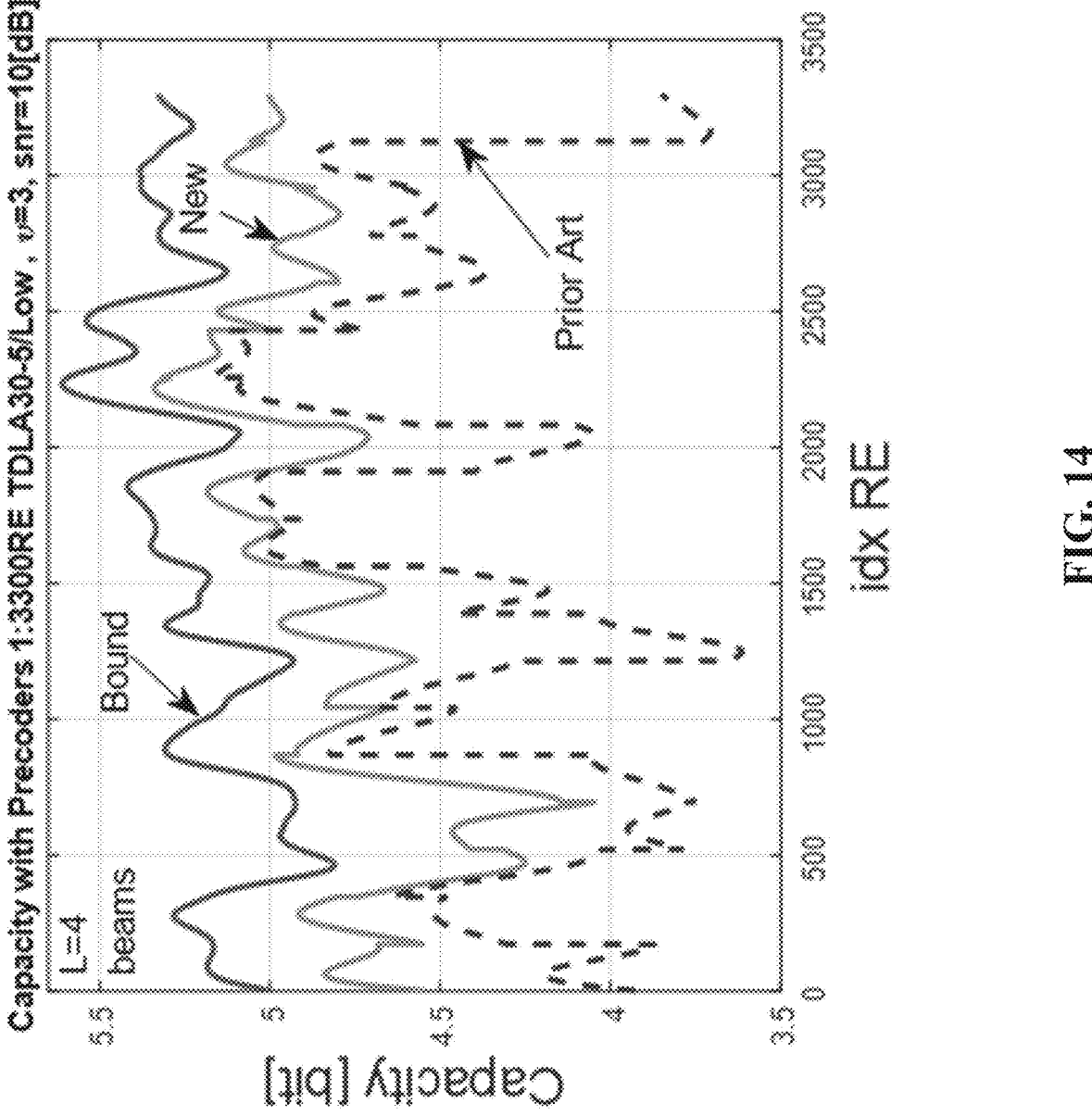
FIG. 14 illustrates a graph of capacity in bits per layer versus idx RE (Resource Element index), where the comparison is for L=4 beams design (as allowed in eType2).

FIG. 10 illustrates a graph of gap in dB versus time slots for a single synchronization strategy ("0") for three layers, where the comparison is for L=4 beams design (as allowed in eType2). FIG. 11 illustrates graphs of gap in dB versus time slots for a 20 synchronization strategies ["0"+19 columns] for three layers, where the comparison is for L=4 beams design (as allowed in eType2). FIG. 12 illustrates graphs of gaps [dB] versus time slots for 20 synchronization strategies. The comparison is for L=4 beams design (as allowed in eType2), where the comparison is for L=4 beams design (as allowed in eType2). FIG. 13 illustrates graphs of capacity [bit] versus time slots for 20 synchronization strategies and for the prior art. FIG. 14 illustrates a graph of capacity in bits per layer versus idx RE (Resource Element index), where the comparison is for L=4 beams design (as allowed in eType2).

One embodiment does not warp the amplitudes (e.g., below a proposal includes a reversible amplitude modification by scaling every column of the input separately. But this modification is not used in the examples of FIGS. 10, 11, 12, 13, and 14, which, for one example of the systems and methods described herein, modifies only the phases of the input and performs the described above synchronization with strategy "0" or with strategies {"0", 1, . . . , 19} (total 20 strategies), while the Prior Art is 5G eType2. The example embodiment performs synchronization of column phases (and does not change the input coefficients amplitudes). Further compression may be done according with eType2 5G alphabet-based precoder. The number of Fourier coefficients (for the presented parameter setting) is $\lfloor 19*p \rfloor = 5$ (independent per layer). The three Fourier coefficient precoding matrices per layers have sizes $(2*4) \times \lfloor 19*p \rfloor = 8 \times 5$ each. The $K_0$ parameter may be calculated as $K_0 = \lceil (8*5) *\beta \rceil = 30$. $K_0$ has meaning of non-zero coefficients for small number of layers (1 or 2 layers) but for 3 or 4 layers the total number of the non-zero (NZ) coefficients (according to the 5G compression) is $K^{NZ} = 2*K_0 = 60$. This corresponds to more aggressive and mandatory by the eType2 coefficient decimation (than for smaller number of layers).

For that demanded crude quantization, with the small number of coefficients remaining namely $K^{NZ}=2*K_0$ and not $K^{NZ}=\upsilon*K_0$ ($2*30=60$ and not $3*30=90$ for the presented parameter), the better compression may be due to better phase synchronization, which becomes a beneficial factor improving the performance. A large number of layers inevitable needs large compression, and in eType2 this large number of decimation (small number of remaining non-zero coefficients) demands a better and more accurate compression and here the proposed scheme performs better than the 5G proposed.

The gap (about the eType2 Prior Art design): For a single strategy "0" (about a wideband eigenvector which may be used as Auxiliary Synchronization Vector (ASV)). Mean gap=0.7023 [dB], Max gap=1.3993 [dB], Min gap=–0.0988 [dB]

For the best strategy out of 20 strategies (used for Auxiliary Synchronization Vector (ASV) choices): "0" is as before synchronization about a wideband eigenvector used as ASV and "1" to "19" synchronization about the SB columns with number 1 to 19 respectively (used as ASV). Mean gap=0.9251, Max gap=1.7082 [dB], Min gap=0.1693 [dB]

For the same number of bits, a better and more robust performance may be: ~0.9 [dB] on the average and ~1.7 [dB] on the maximal gap. Therefore, it may be proposed to utilize the pre-processing approach which leads to better performance for the same number of non-zero coefficients. (The coefficients amplitude and phase quantization are done according to the 5G standard recommendations.

For harmonization with the 5G Standard in the following Releases, as well as 5G Advanced, and 6G, it may be beneficial to use any example of the proposed approaches described herein. However, the System/Operator (governed by BS) may decide to preserve the eType2 as in the Standard (with the restriction regarding the largest coefficient row) or to use as we have described (removing the above constraint of not reporting a row of coefficients corresponding to the largest coefficient containing row, as in the Prior Art). Which approach to use demands just one system bit be sent from the BS to UE. The time interval over which this system information is re-sent or re-considered is governed by the BS and may depend on, e.g., if the UE signals (at some synchronization with BS time) that it may perform this advanced compression. A possible modification of the 5G Standard may be thus in allowing to report the NZ (non-zero) coefficients irrespective of the largest coefficient row (per layer); the "legacy" eType2 precoder can be used as in the standard, or alternatively with reporting is using all rows of the 1 control bit, saying if the current 5G version to be used, or the amplitude normalization for the strongest beam row is not forced and thus its row non-zero coefficients are reported for not DC frequency in the same way as any non-zero transform coefficients.

Reversible (at BS) Columns Amplitude Modification.

For the cases when the input columns are scaled to a unit power norm the channel eigenvectors represent as an input, normalized precoder matrix columns then every column can be also optionally scaled by modifying amplitude as a possible degree of freedom for the compression engine. We clarify that these disclosed multiple degrees of freedom are per every column; they are thus different from a common scaling by a single scalar factor routinely used in NN and mentioned below.

Despite this does not preserves the capacity, the scaling can be utilized for compression only, and it can always be taken away at the BS side by normalizing every column back to equal norm (e.g., to unit norm). This may facilitate vector quantization compression approaches. This degree of freedom can be used for quantization purposes (to shrink the number of bits or to better the precision or for both). This may be referred to as Reversible Scaling (RS).

The AI-NN input can then further scale the modified input together by a common factor to bring the amplitudes into the desired range (e.g., [0 1]).

Input to CSI-compression for incorporating interference rejection.

An observation related to the construction of precoders. It is, to the best of our knowledge, not present in the prior art. (Note also that interference is unknown at the base station, but known at the UE.)

The precoder acts on channel as (below "e" denotes the index of an RE element):

$$r^{(e)} = H^{(e)}W^{(e)}s^{(e)} + n^{(e)}$$

However, the noise term $n^{(e)}$ may contain not only the ambient white noise but also the interference. To cancel or reduce the interference the received signal $r^{(e)}$ at UE array is further pre-processed a linear transformation $T^{(e)}$ as:

$$r^{(e)(with\ interf.\ treatment)} = T^{(e)}r^{(e)} = T^{(e)}H^{(e)}W^{(e)}s^{(e)} + T^{(e)}n^{(e)}$$

For example, for a single strong interferer channel $\hbar^{(e)}$ the canceller eliminates its direction as:

$$T^{(e)(canceller)} \equiv 1 - \frac{\hbar^{(e)}\hbar^{(e)H}}{\|\hbar^{(e)}\|^2}$$

The transform $T^{(e)}$ can also act as noise whitener. A known way to construct the whitening matrix, $T^{(e)}$, is from any factorization of the interference plus ambient noise correlation matrix $C_{noise}$ is known as:

$$T^{(e)(whitening)} = \left(F^{(e)}\right)^{-1}, \text{ where } \alpha_{scaling} * C_{noise} = F^{(e)}F^{(e)H}$$

Here some examples may use an optional scaling of the correlation matrix by $\alpha_{scaling}$ (for no-scaling $\alpha_{scaling}=1$). Now, note that another solution for precoder construction based on the SVD of the physical channel matrix represents precoder optimization under the white noise. Hence, it may be used but after the whitener (or heuristically also after the canceller as if it takes out the interference and approximately remains with the ambient noise) i.e., it be applied to the $T^{(e)}H^{(e)}$ channel. Therefore, the precoder which incorporates the interference treatment, is to be constructed from the eigenvectors of the correlation matrix of the modified channel:

$$H^{(e)(with\ interf.\ treatment)} = T^{(e)}H^{(e)}$$

and not from the eigenvectors of the correlation matrix of the physical channel matrix $H^{(e)}$.

Input to CSI-compression for incorporating precoder matrix factorization. The input to the CSI-Compression engine can incorporate precoder matrix factorization:

$$W_n = W_{(A)n} W_{(B)n}$$

$$\dim W_n = N_T \times v,\ \dim W_{(A)n} = N_T \times \bar{N}_T,\ \dim W_{(B)n} = \bar{N}_T \times v$$

The $W_{(A)n}$ is assumed to be known or optimized separately, and it is $W_{(B)n}$ which is to be compressed. The input to compression can thus be based on the new channel matrix $H_{(A)}$:

$$H_{(A)}^{(e)} = H^{(e)} W_{(A)n}$$

This $W_{(A)n}$ may also be based, constructed or updates by the base station based on historical data patterns observed in the decompressed post-processing information. This will thus influence the new channel matrix, $$H_{(A)}^{(e)},$$

and related the DL channel-related information.

Further, as an option, the base station may be configured to perform DL channel quality estimation based on the reconstructed post-processing information and adjust its operational parameters, here $W_{(A)n}$, accordingly, to optimize system performance. If this precoder is based on a set of "beams", then this set may be adjusted (with one or several adjustments). The optimization may be governed by the reconstruction accuracy or by the UE performance indicator.

The matrix $W_{(A)n}$ can be a matrix from a finite alphabet size (thus with known in advance number of bits to code it) and/or a product of a wideband index n independent matrix $$W_{(A)}^{(1)}$$

and a matrix $$W_{(A)n}^{(2)}$$

which depends on sub-band index n and belong to an alphabet of small size:

$$W_{(A)n} = W_{(A)}^{(1)} W_{(A)n}^{(2)}.$$

If the interference rejection is performed at UE by means of a linear matrix $T^{(e)}$ which performs interference rejection or interference noise whitening, then:

$$H_{(A)}^{(e)} = T^{(e)} H^{(e)} W_{(A)n}$$

For given $W_{(A)n}$, the input $x_n$ to the CSI-compression can be: (1) averaged over sub-band channel matrix $$H_{(A)}^{(e)},$$

(2) a set of $\upsilon$ "best" eigenvectors $\{e_{1(n)}, \ldots, e_{\upsilon(n)}\}$ of the averaged correlation matrix $C_{(A)n}$ applied to the partially averaged channel, and/or (3) a precoder matrix which includes the weighs applied to every eigenvectors:

$$\{e_{1(n)}, \ldots, e_{\upsilon(n)}\} D_{\upsilon \times \upsilon}^{(n)}$$

where $$D_{\upsilon \times \upsilon}^{(n)}$$

is a diagonal matrix with non-negative weights.

The Optimization Way for AI Driven Systems

The cost function depends on the input x, which itself is a set of inputs $x_n$ per sub-band $n = 1:N_S$. These inputs can be modified by a complex-valued matrix $M_n$ (representing matrix degrees-of freedom for optimization). The cost function is:

$$F = f\left(\hat{x},\ x * M, \left\{ \prod_{optional} \right\}\right)$$

Where the compression-decompression is for a given number of bits:

$$\hat{x} = \hat{x}(x, \{M_n\}, \theta_{en}, \theta_{de}) = g_{decoder}(f_{encoder}(x * M, \theta_{encoder}), \theta_{decoder})$$

Recollect that $x_n$ is a set of precoder matrices [namely $W_n$] (at sub-band n) or of eigenvectors of the physical (or as disclosed, the modified [by considering interference rejection] channel: these eigenvectors represent the columns of the precoder matrices: e.g., $$W_n = \frac{1}{\sqrt{\upsilon}} [v_{n(1)}, \ldots, v_{n(\upsilon)}]$$

Here "x*M" mean the input modifications $x_n M_n$ being performed at every sub-band. Reducing the constrained optimization to the unconstrained by using the barrier function (or "penalty" function approach). Then maximizing (for general unitary matrix):

$$L(\{M_n\}, \theta_{en}, \theta_{de}) = f\left(\hat{x},\ x * M, \left\{ \prod_{optional} \right\}\right) -$$

$$\sum_{n=1}^{N_S} \text{Barrier}\left(\left\| M_n M_n^H - 1_{\upsilon \times \upsilon} \right\| + \left\| M_n^H M_n - 1_{\upsilon \times \upsilon} \right\|\right)$$

Here, the barrier function is a fast-growing function of its argument (which is zero if the argument is zero and is positive if the argument is positive [the error norm is always positive if the error matrix is not a zero matrix and is zero if the error matrix is zero matrix (having all its components be zeros); the error matrices presented inside of norms represent the two orthonormality conditions $$\mathbb{U}_n \mathbb{U}_n^H - 1_{v \times v} = 0_{v \times v} \text{ and } \mathbb{U}_n^H \mathbb{U}_n - 1_{v \times v} = 0_{v \times v}]).$$

Another possible implementation is to use the barrier term for every norm separately as $$\sum\nolimits_{n=1}^{N_S} \text{Barrier} \left( \left\| M_n M_n^H - 1_{v \times v} \right\| \right) + \sum\nolimits_{n=1}^{N_S} \text{Barrier} \left( \left\| M_n^H M_n - 1_{v \times v} \right\| \right).$$

For the diagonal matrix, use:

$$M_n = \text{diag}(m_n), \ dim \ m_n = v \times 1, \ n = 1 : N_S$$

Then $$L(\{m_n\}, \theta_{en}, \theta_{de}) = f\left(\hat{x}, \ x * M, \left\{ \prod\nolimits_{optional} \right\} \right) -$$

$$\sum_{n=1}^{N_S} \text{Barrier} \left( \left\| \text{diag}(m_n) * \text{diag}(m_n)^H - 1_{v \times v} \right\| \right)$$

Here, for AI based systems assume that the weights $\theta_{en}$, $\theta_{de}$ are determined by any algorithm based on (1) the original input (no modification: the Prior Art for AI/ML) and/or (2) optionally and as proposed on a specific unitary way of pre-modification (e.g., (a) on the synchronization by the auxiliary vector being an eigen-vector of the wideband correlation matrix $a_{(\ell)} = e_{(\ell)}$, (b) on the prior art way (but which is not covered in the prior art for AI/ML), or on any other way which could be suggested, e.g., by the future Standard releases). The initial synchronization may also use the best left eigenvector $a_{(\ell)} = u_{(\ell)1}$ (explained further herein), or a column of the of the input matrix $a_{(\ell)} = x_{(\ell)n}$ e.g., with index n being $n = \lfloor N_S/2 \rfloor$ (or a value close to n), or be based on the Component Sum Approach (CSA) and Weighted CSA explained further below.

This follows the observation that multiplication of unitary matrices is a unitary matrix.

$$\mathbb{U}_n^{(1)} * \mathbb{U}_n^{(2)} * \dots * \mathbb{U}_n^{(Noptimizations)} \in \text{ Unitary if } \mathbb{U}_n^{(k)} \in \text{ Unitary.}$$

Hence, if a pre-fixed modification is used, the task of the modification is to further better the performance. The pre-modification will set the AI/ML initial parameters (e.g., NN coefficients). This will allow faster learning or re-learning as opposed to some prior art examples where the phases have been artificially randomized during the learning stage. Then, for the fixed (known or pre-trained) AI weights, the mentioned above modifications $\{M_n\}$ or $\{m_n\}$ are applied (at every sub-band $n = 1 : N_S$) to make the performance better. These modifications are found because of unconstrained optimization based on the barrier functions. This is an effective and popular way for the NN optimization systems. The optimization above conveniently represents the addition of a single NN layer. However, this layer is essentially absent in the standard Prior Art AI/ML approaches since they are trained (and $\theta_{en}$, $\theta_{de}$ are found) to compress and the reconstruct the original input x with minimal norm loss:

$$PriorArtLoss = \|\hat{x} - x\|^2$$

While one of the proposed loss functions is about the modified input:

$$NewLoss = \left\| \hat{x} - x^{(modified)} \right\|^2$$

This leads to a specific example of the cost function (the minus sign before the norm is due to mentioned above maximization of the "utility" function, while for minimization routines it is not needed and should be thus omitted):

$$F = f\left(\hat{x}, \ x * M, \left\{ \prod\nolimits_{optional} \right\} \right) = -C * \|\hat{x} - x * M\|^2$$

Here, the positive constant C may be equal to one, C=1, or be adjusted to represent the averaging as explained below.

For $N_S$ sub-bands, the above relation can be further rewritten as:

$$F = f\left(\hat{x}, \ x * M, \left\{ \prod\nolimits_{optional} \right\} \right) =$$

$$-\frac{1}{N_S} \|\hat{x} - x * M\|^2 = -\frac{1}{N_S} \sum\nolimits_{n=1}^{N_S} \|\hat{x}_n - x_n * M_n\|^2$$

We note that the input, x, may be presented in frequency and time through several (or during the training or re-training phases: multiple) OFDM symbols (which in every symbol may cover in full all $N_S$ sub-bands or in part some of the sub-bands, and the part of the sub-bands may also be in general different for the different OFDM symbols). Then, the utility function represents the averaging over available input x. The parameters $\theta_{en}$, $\theta_{de}$ and the set of $\{M_n\}$ are preserved the same for this available input x.

The set of optimal parameters $\{\Pi_{optional}\}$ may contain the channel matrix or the channel matrix SVD eigenvalues ("sigmas") related to the eigenvectors upon which the precoder is constructed. Then, the utility function for maximization may represent the capacity based on this channel and on reconstructed precoder represented by $\hat{x}$.

For clarity we note that despite the capacity is independent on the unitary transform of the precoder matrix (and this is the reason to apply it), the similarity of the input data x can be bettered by this modification, thus leading to better performance (larger capacity) for the given compression.

Note also that the weighting of the error may also include its performance influence. This can be, e.g., done for diagonal unitary matrix (used with diagonal weights $m_n$ and barrier function to ensure unitarity as described above):

$$F = f\left(\hat{x}, \ x * M, \left\{ \prod\nolimits_{optional} \right\} \right) = -\frac{1}{N_S} \sum\nolimits_{n=1}^{N_S} \sum_{\ell=1}^{v} w_{(\ell)n} \|\hat{x}_{(\ell)n} - x_{(\ell)n} * m_{(\ell)n}\|^2$$

and e.g., $$w_{(\ell)n} = \sigma_{(\ell)n}^2$$

Here $m_{(\ell)n}$ demotes the $\ell$-th component of the vector $m_n$ and $$\sigma^2_{(\ell)n}$$

is the squared eigenvalue of the corresponding input eigenvector (e.g. of the averaged over sub-band channel correlation matrix).

For the general unitary transform, the weights can be simplistically done as the sum of the powers in all the layers at the sub-band n:

$$F = f\left(\hat{x}, \ x*M, \left\{\prod_{optional}\right\}\right) = -\frac{1}{N_S} w_n \sum_{n=1}^{N_S} \|\hat{x}_n - x_n * M_n\|^2$$

where e.g., $$w_n = \sum_{\ell=1}^{v} \sigma^2_{(\ell)n}$$

Another possible maximization criterion is to use the cosine similarity (CS) between the original and the reconstructed sets of the channel eigenvectors.

Multiple possible ways to construct the barrier functions are not specified here. This may be a developed art of optimization. Finally, note that in many current packages the matrices are real-values, then the above matrix operations of complex-valued matrices are to be transformed into real-valued matrices as it is known in the Art.

Figure 15:
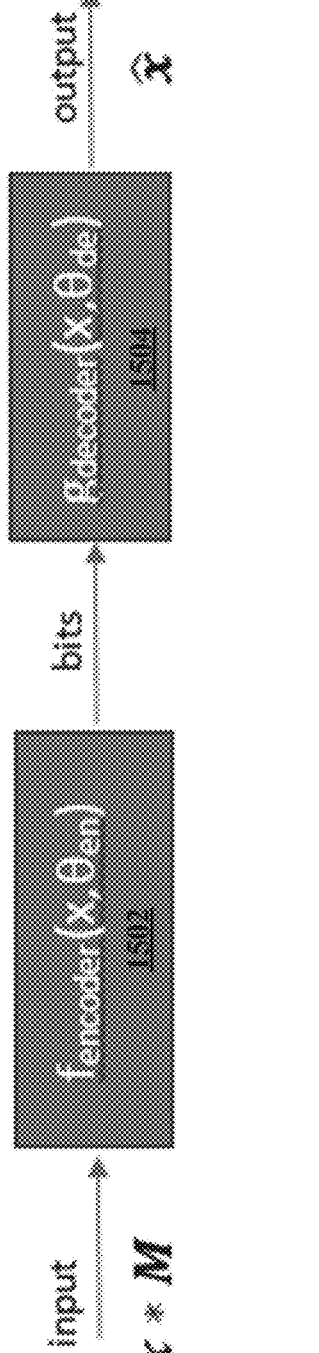
FIG. 15 illustrates a diagrammatic representation of a sophisticated signal processing system that involves data compression and decompression, specifically tailored for applications handling data across multiple sub-bands.

FIG. 15 provides a diagrammatic 1500 representation of a sophisticated signal processing system that involves data compression and decompression, specifically tailored for applications handling data across multiple sub-bands. The figure illustrates the flow and transformation of data. Block 1502 (Encoder) processes the input data, which may comprise sets of inputs $x_n$ for each sub-band n, where n=1 to $N_S$. Each $x_n$ can represent precoder matrices $W_n$ or eigenvectors of the channel, which are modified by a complex-valued matrix $M_n$. The matrix $M_n$ embodies matrix degrees of freedom for optimization, may be needed for adjusting the data before compression. The operation performed here is x*M, which is a modification operation $x_n M_n$ applied to each sub-band's input data. The encoder applies a function $f_{encoder}$ parameterized by $\theta_{en}$, compressing the modified data into a given number of bits. The cost function, F, dependent on the output x, is aimed at optimizing the compression process under constraints transformed into an unconstrained format using a barrier function.

Block 1504 (decoder) receives the bitstream from Block 1002 and processes it to reconstruct the data. The decoder uses a function $g_{decoder}$ parameterized by $\theta_{de}$, aiming to decode the compressed data back into a form as close to the original as possible. The ultimate output is an estimate of the original data based on the encoded and subsequently decoded information, influenced by the matrices $M_n$ and the parameters $\theta_{en}$ and $\theta_{de}$.

The optimization focuses on maximizing the likelihood function L, which includes the cost function F and a barrier function that penalizes the matrix $M_n$ for deviating from unitarity. The barrier function grows rapidly, ensuring that $M_n$ closely adheres to being a unitary matrix, which may be needed for maintaining the integrity of the signal transformation and compression.

This setup, as depicted in FIG. 15, highlights the complexity and sophistication of handling signal processing across multiple sub-bands, utilizing matrix transformations to optimize data compression and reconstruction, which may be needed in telecommunications and other data-intensive fields where bandwidth and data fidelity are of paramount importance.

The Prior Art for eType2 leads to:

For L=4 beams 3 layers:

mean (gap) = 0.93, max (gap) = 1.71 [dB], min (gap) = +0.17 [dB]

For L=6 beams (not permitted in the current version of eType2, but might be this restriction will be relaxed in the future; also, the results below consider that both Prior Art perform phase only phase synchronization based on dephasing of the strongest beam but no amplitude warping of the amplitudes of the strongest beam (forcing them be all equal to the largest amplitude coefficient per layer) is performed for the Prior Art; differently from the current eType2 all the non-zero coefficients are reported back irrespective of their position about the strongest beam row):

mean(gap)=1.6[dB], max(gap)=2.12[dB], min(gap)=+0.13[dB] // 4 layers
mean(gap)=0.93[dB], max(gap)=1.90[dB], min(gap)=+0.11[dB] // 3 layers
mean(gap)=0.19[dB], max(gap)=0.53[dB], min(gap)=−0.003[dB] // 2 layers The Prior Art is for eType2 only. It does not cover AI/ML schemes. The proposed pre-processing scheme is more general then specific 5G eType2. It can be used as a pre-processing step where the pre-processing degrees of freedom are used and optimized to better the compression or performance (for given compression). It can be applied for coming AI-based schemes (could be in late releases of 5G, or in 6G).

If the new scheme is used as the preprocessing of eType2, then the only restriction of eType2 to be relaxed (removed) is that now all the non-zero coefficients of the transformed input are reported, while in the current eType2 version the coefficients corresponding to the index of the strongest beam (per layer) are not reported (assuming the largest coefficient be 1 and others be zero on this row (per layer)). Since the many-layer compression demands large coefficient decimation (to preserve a limited size of the total feedback from UE to the BS), then for this situation a better similarity of the input delivered by the New design becomes especially important and it leads to the superior performance.

No such step is known to us in the Prior Art nor in the Literature (pre-processing is limited to the input amplitudes scaling).

The scheme can (in some circumstances, e.g., popular equal loading per layer) use not only diagonal unitary matrices, but general unitary matrices to make the input parts be more similar and better compressed.

The approach may work for FDD and for TDD modes. An example embodiment includes a precoder optional construction which considers the interference rejection or reduction at the UE side. This may be of importance when the UE density is growing, and for multiple UEs situated close to the cell boundary.

Performance of the "Strategies"

In particular, for the case of diagonal unitary matrices, may show that if a single auxiliary vector strategy based on the averaged correlation matrix eigenvector ("strategy 0") is used, and not prior proposals, the eType2 precoder will better its performance by the following gaps (for TDLA-30-5/LOW, 100 MHz):

For L=4 beams 3 layers:

mean (gap) = 0.70 [dB], max (gap) = 1.40 [dB], min (gap) = −0.10 [dB]

For L=6 beams:

mean(gap)= 0.75[dB], max(gap)=2.12[dB], min(gap)= −0.17 [dB] // 4 layers
mean(gap)=0.74[dB], max(gap)=1.67[dB], min(gap)=−0.11[dB] // 3 layers
mean(gap)=0.15[dB], max(gap)=0.48[dB], min(gap)=−0.10[dB] // 2 layers When the best out of 20 strategies ("0" and "1:19") is selected for the named auxiliary vector, then the performance can be bettered further For L=4 beams 3 layers:

mean (gap) = 0.93, max (gap) = 1.71 [dB], min (gap) = +0.17 [dB]

For L=6 beams:

mean(gap)=1.6[dB], max(gap)=2.12[dB], min(gap)=+0.13[dB] // 4 layers
mean(gap)=0.93[dB], max(gap)=1.90[dB], min(gap)=+0.11[dB] // 3 layers
mean(gap)=0.19[dB], max(gap)=0.53[dB], min(gap)=−0.003[dB] // 2 layers Capacity conservation proof: the original template sub-bands precoder acts per RE e as $$r^{(e)} = H^{(e)} W s^{(e)} + n^{(e)}$$

and its modification (for a given precoder W)

$$r^{(e)} = H^{(e)} W \mathbb{U} s^{(e)} + n^{(e)}$$

In an example embodiment, the capacity of the effective channels is:

$$B^{(e)} = \log_2 \det \left(1_{v \times v} + H_{eff}^{(e)H} H_{eff}^{(e)}\right)$$

This is the same for:

$$H_{eff}^{(e)} = H^{(e)} W \text{ and } H_{eff}^{(modified)(e)} = H^{(e)} W \mathbb{U}$$

where $\mathbb{U}$ is the unitary transform matrix. To see this, factorize the relation below as:

$$1_{v \times v} + H_{eff}^{(modified)(e)H} H_{eff}^{(modified)(e)} =$$

$$\mathbb{U}^H \mathbb{U} + \mathbb{U}^H H_{eff}^{(e)H} H_{eff}^{(e)} \mathbb{U} = \mathbb{U}^H \left(1_{v \times v} + H_{eff}^{(e)H} H_{eff}^{(e)}\right) \mathbb{U}$$

Using the unitary matrix property:

$$1_{v \times v} = \mathbb{U}^H \mathbb{U}$$

Since for any matrices A, B and C:

$$\det(ABC) = \det(A) * \det(B) * \det(C)$$

and since $1 = \det(1_{v \times v}) = \det(\mathbb{U} \mathbb{U}^H) = \det(\mathbb{U}) * \det(\mathbb{U}^H)$, the determinant is the same value with the original and for the modified precoders. Then its $\log_2 \det( \ldots )$ is identical and thus the capacity preserves. QED. Assume matrices W and $\mathbb{U} \mathbb{U}$ be constant per every sub-band and thus do not mark them with the element indices.

In some embodiments, to modify the input before the first learning pass (e.g., based on eigen-vector synchronization or any synchronization). The AI model then learns already more similar columns and thus have a better performance. Reduction of Degrees of Freedom (DoF) in the learning process will accelerate the AI model parameters (NN weighs) learning. This is different from the proposal to randomize the input by arbitrary phasor modifications.

The above-mentioned initial synchronization is a general idea. Below two specific possible ways to perform that efficiently by utilizing auxiliary synchronization vectors (ASV) $a_{(\ell)}$ and by using presented equation which separately per layer $\ell$ modifies $N_S$ columns $x_{(n)\ell}$ of the inputs $x_{(n)}$ are presented as:

$$x_{(\ell)n}^{(modified)} = x_{(\ell)n} \frac{x_{(\ell)n}^H a_{(\ell)}}{\left|x_{(\ell)n}^H a_{(\ell)}\right|} \text{ for columns } n = 1{:}N_S \text{ (per layer } \ell = 1{:}v)$$

$$\text{e.g., for columns } n = 1{:}19 \text{ (per layer } \ell = 1{:}4)$$

$$(\text{EQUATION "}Aux \cdot Synch \cdot Vec\text{"})$$

Here the ASV may be constructed as (we present two possible ways): (a) about the averaged correlation channel matrix $C = \langle H^H H \rangle$ (where the averaging may include weighting and optionally partial averaging of the channel matrix inside of parts of sub-bands before constructing the correlation (to reduce the computation complexity of multiple matrix products) best eigenvectors, $$C e_k = \lambda_k e_k,$$

be taken as $a_{(\ell)}$ i.e., assuming the descend order of eigenvalues (where the 1st eigenvector corresponds to the largest eigenvalue etc):

$$a_{(\ell)} = e_\ell$$

Note that this goes beyond the input, to the original "raw" channel matrix information from which the input (typically SB (sub-band) reduced from the full CSI) is constructed. UE does have channel matrix information, and thus can perform calculation of C. Note that construction of C uses the information which is not the input matrices $x_n$ $n=1{:}N_S$, and/or (b) about the input's SVD best left eigenvectors. For every (fixed) layer $\ell$, the 2D matrix $M_{(\ell)}$ of $N_S$ columns is assembled:

$$M_{(\ell)} = \left[x_{(\ell)1}, \ldots, x_{(\ell)N_S}\right]$$

Its SVD (i.e. of the matrix $M_\ell$ ) can be calculated:

$$M_{(\ell)} = \sum_k \sigma_{(\ell)k} u_{(\ell)k} v_{(\ell)k}^H.$$

Let us assume that the indices "k" are ordered such that the values of the eigenvalues $\sigma_{(\ell)k}$ (which are always real-valued and non-negative, e.g., for SVD) are in the descending (from the largest to the smallest). Then, take the auxiliary synchronization vector (ASV) as $$a_{(\ell)} = u_{(\ell)1}$$

and perform the above mentioned (initial) column synchronization (see eq. (EQUATION "Aux.Synch.Vec")).

To find $u_{(\ell)1}$ efficiently, no actual SVD need to be performed, but one is to find the eigen-vector corresponding to the largest eigen-value. A possible effective way to perform this is to let $M_{(\ell)}=N_1{\times}N_S$. Then for the case:

$$N_1 \le N_S,$$

the hermitically symmetric matrix may be construct:

$$C_{(\ell)} = M_{(\ell)}M_{(\ell)}^H$$

which has $u_{(\ell)k}$ as its eigenvectors. Then, the well-known power method iteration can be used to find $u_{(\ell)1}$ .

For the case, $N_1{>}N_S$, construct:

$$C_{(\ell)} = M_{(\ell)}^H M_{(\ell)}$$

which has $v_k$ as its eigenvectors. Then, the well-known power method iteration will deliver $v_1$. Then, due to the eigenvector's orthogonality, $\sigma_{(\ell)1}u_{(\ell)1} = M_{(\ell)}v_{(\ell)1}$, thus $$u_{(\ell)1} = \frac{M_{(\ell)}v_{(\ell)1}}{\sqrt{\|M_{(\ell)}v_{(\ell)1}\|^2}}.$$

This explicit unitary "initial synchronization" may become part of the Standard. Since not every column structure needs to be learned, but a sub-set of the general input representing the synchronized structures, this accelerates of the learning phase and thus shortening of the learning time. This feature may be useful for time-variable channels when the re-learning of the coefficients may be required (including moderate and high-speed moving UEs). Improving Performance and/or Reduction on Complexity [of the AI/ML solution (e.g., Neural Network (NN) size)]

Explicit usage of the unitary degree of freedom makes the input be more similar thus allowing better compassion for given compression size (e.g., for given number of bits or for average number of bits to be communicated from encoder to the decoder).

Thus e.g., for fixed weights of the NN (neural networks) of Encoder and Decoder or in general for fixed parameters of the Encoder and Decoder, application of the synchronization by Unitary matrices improves the communication performance.

This follows from: for fixed parameter of encoder and decoder, the unitary matrix varies in such a way to reduce the error $\|\hat{x}-x^{(modified)}\|$. Since the input x is designed (by UE) to optimize performance (e.g., average Capacity or average sum of RX Power (see the definitions and relation in the Definition/examples of "DL communication performance" Criteria Section below), and since x modifications by unitary matrices $x^{(modified)}$ preserve the input performance, thus the smallest reconstruction error allows performance with $\hat{x}$ be closer to the performance with optimized solution x.

This improvement may be traded off (in full or in part then still leading improvement) for reduced complexity of the Encoder and Decoder. For NN that will be reduction in the number of layers and/or number of weights. This may be summarized as: (1) improve the performance of the AI solution (even without changing its learned NN weights or more generally parameters of the AI/ML) performing unitary matrix adjustment to further reduce the error $\|\hat{x}-x^{(modified)}\|$, and (2) reduce the complexity of AI solution (number of layers or weights): By getting a better performance, a trade-off can be made for the same performance as without the proposed optimization.

Note that better accuracy may facilitate less frequent precoder update.

Definition/examples of "DL channel related information": Set of Channel Eigenvectors, Precoder Matrix, DL channel matrix.

We note that when the interference rejection is performed at UE by means of a linear matrix $T^{(e)}$ which performs interference rejection or interference noise whitening, then the "DL channel related information" may include not the physical channel but the channel after the interference treatment by $T^{(e)}$ as we presented and explained in the text (namely as $H^{(e)(with\ interf.\ treatment)}=T^{(e)}H^{(e)}$ or $$H_{(A)}^{(e)(with\ interf.treatment)} = T^{(e)}H^{(e)}W_{(A)n}$$

if precoder factorization is applied).

Definition/examples of "DL communication performance" Criteria: Average Quantity, where the averaging is over the BW (bandwidth) of a single or several OFDM symbols ($N_{RE}$ is the number of RE in the frequency-time "chunk"). It can be frequency-time averaged over index e:

$$Q = \langle Q_e \rangle = \frac{1}{N_{RE}}\sum_{e=1}^{N_{RE}} Q_e$$

The quantity can be, but is not limited to capacity, capacity related, and/or power. The capacity, $C_e$ at RE with index k can be calculated from:

$$Q_e = C_e = \log_2 \det(1 + snr * W^H H^H HW)_{at\,RE\,with\,index\,e}$$

with exact SNR or with a possible predefined value e.g., snr can be set in the capacity relation to 10 [dB] with no relation if it is the actual SNR.

Capacity related may be:

$$Q_e = C_e = \log_2 \det(W^H H^H HW)_{at\,RE\,with\,index\,e}$$

The justification/explanation of that follows from factorization of the SNR from the capacity relation for moderate and high SNRs:

$$C_e = \log_2 \det(1 + snr * W^H H^H HW)_{at\,RE\,with\,index\,e} \approx const +$$
$$\log_2 \det(W^H H^H HW)_{at\,RE\,with\,index\,e}$$

Power (represents sum of powers on all UE antennas). Since the RX equation for UE RX antenna array is r=HWs+ n, (dim r=$N_R$×1) thus ignoring the noise, the RX power over $N_R$ RX antennas is given by the following $Q_e$:

$$Q_e = \text{Trace}(W^H H^H HW)_{at\,RE\,with\,index\,e} = \|(HW)_{at\,RE\,with\,index\,e}\|_2^2$$

Here the power norm of a matrix $$\|M\|_2^2$$

is the sum of powers of its elements $\Sigma_{i,j}|M_{i,j}|^2$. Here, (for brevity the "hat" above is omitted) the W is based on the reconstructed $\hat{x}_n$ (where n is the index of the sub-band (SB to which the RE with index e belongs). Note that the number of sub-bands is typically much smaller than the number of REs (e.g., 19 SB and ~3300 REs for 100 MHz spectrum with 30 kHz spacing). Then, the value of W can be assumed to be constant over the sub-band (or optionally be interpolated over the REs using the sub-bands values as reference points).

Such estimation can be done at UE, which knows the channel (in full or in the pilot positions), assuming the UE has the full knowledge of the encoder and decoder, or during the training (of the encoder-decoder) where such knowledge is assumed.

Note that the average can be approximated (or be exact for the power criterion) by averaging (over a sub-band) the channel correlation matrix $\langle H^H H\rangle$ and substituting this value back into the Q expression (e.g., Q=$\langle Q_e\rangle$=$\langle$ Trace $(W^H H^H HW)_{at\,RE\,with\,index\,e}\rangle$ can be written as Q=Trace($W^H \langle H^H H\rangle$ W)).

Another metric, which only in part is related to the properties of the communication channel, is the averaged Cosine Similarity (CS) between columns of the $x^{(modified)}$ and the CS's reconstruction $\hat{x}$, Q=$\langle$CS$\rangle$. The averaging, $\langle$ . . . $\rangle$, may be done overall CS values of vectors $$x_{(\ell)n}^{(modified)}$$

and corresponding $\hat{x}_{(\ell)n}$. Here CS for two complex-valued vectors a and b may be defined as $$CS = \frac{|a^H b|^2}{\|a\|^2 \|b\|^2} = \frac{|a^H b|^2}{(a^H a)(b^H b)}.$$

Since the reconstruction, as discussed, is $\hat{x}=\hat{x}(x, \{M_n\}, \theta_{en}, \theta_{de})$ then direct optimization (maximization) of Q (representing the DL communication performance) may be governed via optimization of $\{M_n\}, \theta_{en}, \theta_{de}$ parameters. As explained, the optimization may be done by using barrier functions (e.g., which may guarantee the orthonormality of $\{M_n\}$).

The term "compression error metric" refers to a measure of the discrepancy between the post-processing-based information obtained from the UE and the reconstructed post-processing-based information derived at the base station.

This is the averaged norm of the error, typically the MSE of the error, where the averaging is over the (granulated into sub-bands) input (of size $N_S$, typically representing the number of sub-bands):

$$E = \langle E_n\rangle = \frac{1}{N_S}\sum_{n=1}^{N_S} E_n$$
$$E_n = \|\hat{x}_n - x_n^{(modified)}\|_2^2$$

where:

$$x_n^{(modified)} = x_n U_n, \text{ for every } n = 1:N_S$$

and $\hat{x}_n$ is the reconstructed modified input $$x_n^{(modified)}.$$

Here, $x_n$ is the input matrix containing at the sub-band n. Typically, it is the set of $\upsilon$ best eigenvectors of the channel or the DL precoding matrix (calculated by UE).

The term compression size represents the output size of the encoder in number of bits. It is equal to the number of bits on the input of the decoder.

The optimization may be performed about a joint criterion which maximizes Q and minimizes E (or maximization of −E). The optimization can also be performed in steps using identical or different optimization criteria at each step: e.g. minimization of E be done first and it is followed by maximization of Q. Every step may update all or only a part of optimization parameters consisting of the unitary matrices and parameters of the encoder and decoder, e.g. at some step the encoder and decoder parameters may be fixed and the unitary matrices are to be further updated. Alternatively, the unitary matrices are fixed and the precoder and decoder parameters may be optimized. Such multi-step optimization may be especially efficient for integration of the unitary matrix pre-processing with pre-existing CSI-compression solutions.

For the alphabet-based schemes the decoder is automatic. The bit-vector parts represent the compressed coefficients related to selected indices of a transform (e.g., Fourier transform indices); the indices of the transform are also part of the bit-vector.

Example: Several transforms can be used: e.g., two transforms and then $W_{(\ell)} = T_{(\ell)1} M_{(\ell)} T_{(\ell)2}^{H} D_{(\ell)}$ where $T_{(\ell)1}$ and $T_{(\ell)2}$ are part of matrices (representing these transforms) and a diagonal matrix $D_{(\ell)}$ represents power scaling of the columns (e.g., to the identical value); here dim $W_{(\ell)} = N_T \times N_S$ and $\ell = 1 : \upsilon$. The full transforms are known in advance; thus, parts of the bits indicate which columns form the full set of $T_1$ and $T_2$ are chosen (the sets of the chosen/selected columns may depend on the layer number); matrix M represents (quantized) coefficients. We further note, as an example, that the full matrices $T_1$ and $T_2$ may be (one or both) belong to a family of Fourier Transform.

For AI/ML based schemes multiple techniques are used. Then e.g., the bits can be an output of an autoencoder with thus fixed (rigid) size.

Note that the output bits still can be correlated and thus there is an ability to lossless compress them further with e.g., a kind of arithmetic coding (but then of variable length). [For example, the encoder can be a combination of Feature Encoder followed by Entropy Encoder (representing context-adaptive binary arithmetic coding (CABAC)).

Hence, the compression size can be a given number of bits, e.g., fixed, or rigid (the simplest one), upper limit (e.g., by the size of the input to the entropy encoder which further compress it), and/or the average number of bits: this last option depends on the channel.

Construct channel correlation matrix for case more general than the bare precoder, namely for precoder being factorized into product of two matrices: $W_n = W_{(A)n} W_{(B)n}$ (where n is the index of sub-band, every SB typically containing multiple REs). The factorized precoder acts on channel per RE with index e as $$H^{(e)} W_n = H^{(e)} W_{(A)n} W_{(B)n} \equiv H_{(A)}^{(e)} W_{(B)n}$$

$$\text{where: } H_{(A)}^{(e)} = H^{(e)} W_{(A)n}$$

represents thus an "effective" channel (created by the $W_{(A)n}$ precoder part), upon which the precoder $W_{(B)n}$ is further applied.

$W_{(A)n}$ is assumed to be known or optimized separately and $W_{(B)n}$ is to be compressed.

Note that if no factorization is used, then $W_{(A)n} = 1_{N_T \times N_T}$ and $$H_{(A)}^{(e)}$$

is the usual physical channel matrix $H^{(e)}$.

The channel sub-band correlation matrix $C_{(A)n}$ related to the channel "effective" channel $$H_{(A)}^{(e)}$$

is constructed from the partially averaged channel. In general, the averaging can be done as is the following: (1) The sub-band can be divided into several (not necessarily equal size) sub-intervals, $K_n$, over which the channel $$H_{(A)}^{(e)}$$

is averaged and at every sub-interval the correlation matrix is constricted from the averaged channel; then the constructed $K_n$ correlation matrices are averaged into a single correlation matrix representing the sub-band n. Symbolically, this two-step averaging can be written as:

$$C_{(A)n} = \left\langle \left\langle H_{(A)}^{(e)} \right\rangle_1^H \left\langle H_{(A)}^{(e)} \right\rangle_1 \right\rangle_2$$

Here the first averaging is of the channel over the REs inside of every sub-interval (inside of the sub-band n), then the second averaging is of correlation matrices over the sub-intervals. For example, the averaging can be performed as:

$$C_{(A)n} = \sum_{k=1}^{K_n} w_{k(n)} \left\langle H_{(A)}^{(e)} \right\rangle_{(k(n))}^{H} \left\langle H_{(A)}^{(e)} \right\rangle_{(k(n))}$$

Here $$\left\langle H_{(A)}^{(e)} \right\rangle_{(k(n))}$$

denotes the averaging within sub-interval k of sub-band n. The weights $$w_{k(n)} \geq 0 \text{ and } \sum_{k=1}^{K_n} w_{k(n)} = 1.$$

The weights may depend on the performance function (e.g., capacity calculated over the sub-interval) or be simplistically equal (and thus $w_{k(n)} = 1/K_n$).

This includes the limiting case when the channel is averaged over the whole sub-band and the correlation matrix is constructed from the averaged channel as:

$$C_{(A)n} = \left\langle H_{(A)}^{(e)} \right\rangle^{H} \left\langle H_{(A)}^{(e)} \right\rangle$$

In another limiting case the number of sub-intervals is equal to the number of RE is the sub-band and thus:

$$C_{(A)n} = \sum_{e \in subband\#n} w_{e(n)} H_{(A)}^{(e)H} H_{(A)}^{(e)}$$

where the sum of the weights is normalized to 1 as $$\sum_{e \in subband\#n} w_{e(n)} = 1$$

For the example of the equal weights, this leads to $$C_{(A)n} = \frac{1}{N_e} \sum_{e \in subband\#n} H_{(A)}^{(e)H} H_{(A)}^{(e)} = \langle H_{(A)}^{(e)H} H_{(A)}^{(e)} \rangle$$

where $N_e$ is the number of RE participating in the above averaging. Note that the presented averaging adds robustness (especially if the channel is known approximately) to the construction of the correlation matrix (and to the calculation of its eigenvectors and eigenvalues if needed). Here $$H_{(A)}^{(e)}$$

follows the precoder matrix $W_n$ factorization:

$$W_n = W_{(A)n} W_{(AB)n}$$

$$\dim W_n = N_T \times \upsilon, \dim W_{(A)n} = N_T \times \overline{N}_T, \dim W_{(B)n} = \overline{N}_T \times \upsilon$$

Here $W_{(A)n}$ is assumed to be known or optimized separately. It can be a matrix from a finite alphabet and hence demanding a known in advance number of bits related to the alphabet size. The matrix $W_{(A)n}$ can also be a product of a wideband index n independent matrix $$W_{(A)}^{(1)}$$

and a matrix $$W_{(A)n}^{(2)}$$

which depends on n and belong to an alphabet of small size:

$$W_{(A)n} = W_{(A)}^{(1)} W_{(A)n}^{(2)} \cdot W_{(B)n}$$

is to be compressed. The precoder $W_{(B)n}$ acts thus over "effective" channel matrix $H_{(A)}$ defined per RE (below e is the index of RE) as $$H^{(e)} W_n = H^{(e)} W_{(A)n} W_{(B)n} \equiv H_{(A)}^{(e)} W_{(B)n}$$

where:

$$H_{(A)}^{(e)} = H^{(e)} W_{(A)n}$$

This section describes also the no-factorization case with $W_{(A)n}$ being unit matrix $1_{N_T \times N_T}$. When the interference rejection is performed at UE by means of a linear matrix $T^{(e)}$ which performs interference rejection or interference noise whitening, then $$H_{(A)}^{(e)} = T^{(e)} H^{(e)} W_{(A)n}$$

The matrix $W_{(A)n}$ may represents (via its $N_T$ columns) a subset of the full basis vectors of the complex-valued $\mathbb{C}^{N_T}$ space. This matrix may be chosen as a sub-set of columns form a full square matrix and known in advance transform. E.g., in the 5G prior art, the basis is of the Fourier Transform, as it is done in 5G. Every of the two BS array polarizations (transmitted from different antenna array elements) are treated identically and these columns are named "beams":

$$W_{(A)n} = \begin{bmatrix} B & 0 \\ 0 & B \end{bmatrix}, B = [b_1, \dots, b_L],$$

$$\dim W_{(A)n} = N_T \times 2L, \dim B = \frac{N_T}{2} \times L, \dim 0 = \frac{N_T}{2} \times L \text{ (zero components)},$$

$$\dim b_i = \frac{N_T}{2} \times 1$$

Here number of beams, $b_i$, is L. As mentioned, the same beams are used in 5G are simultaneously used for two polarizations.

Component Form (if Needed, for a Better Understanding)

The original and the transformed matrices are presented below for better clarity in the coordinate form. They represent $x_{(n)l}$ and $$x_{(\ell)n}^{(modified)}$$

as 2D matrices with $N_S$ columns for fixed information layer index $\ell$ and variable $n=1:N_S$ $$x_{(\ell)} = \left[ \begin{bmatrix} X_{1,1}^{(\ell)} \\ X_{2,1}^{(\ell)} \\ \vdots \\ \cdots \\ X_{\overline{N}_T,1}^{(\ell)} \end{bmatrix}, \begin{bmatrix} X_{1,2}^{(\ell)} \\ X_{2,2}^{(\ell)} \\ \vdots \\ \cdots \\ X_{\overline{N}_T,2}^{(\ell)} \end{bmatrix}, \dots, \begin{bmatrix} X_{1,N_S}^{(\ell)} \\ X_{2,N_S}^{(\ell)} \\ \vdots \\ \cdots \\ X_{\overline{N}_T,N_S}^{(\ell)} \end{bmatrix} \right]$$

For the special case when unitary matrix is a diagonal matrix, the diagonal unitary matrix transforms $x_n \mathbb{U}_n$ applied at every $n=1:N_S$ lead to modification of every column by a phasor factor $e^{j\varphi(\ell)n}$:

$$x_{(\ell)}^{[modified]} = \left[ e^{j\varphi(\ell)1} * \begin{bmatrix} X_{1,1}^{(\ell)} \\ X_{2,1}^{(\ell)} \\ \vdots \\ \cdots \\ X_{\overline{N}_T,1}^{(\ell)} \end{bmatrix}, e^{j\varphi(\ell)2} * \begin{bmatrix} X_{1,2}^{(\ell)} \\ X_{2,2}^{(\ell)} \\ \vdots \\ \cdots \\ X_{\overline{N}_T,2}^{(\ell)} \end{bmatrix}, \dots, e^{j\varphi(\ell)N_S} * \begin{bmatrix} X_{1,N_S}^{(\ell)} \\ X_{2,N_S}^{(\ell)} \\ \vdots \\ \cdots \\ X_{\overline{N}_T,N_S}^{(\ell)} \end{bmatrix} \right]$$

Here every column has $\overline{N}_T$ elements, which corresponds to more general case of precoder factorization. If no factorization is used, $\overline{N}_T = N_T$ i.e., the number of BS TX antennas.

Further, this representation also helps to better see an additional simple and non-optimal heuristic approach to the columns phase modification, which considers all column amplitudes $$\varphi_{(\ell)k} = -\text{angle}(p_{(\ell)k}),$$

Here the minus sign is used for de-phasing. The complex values $p_{(\ell)k}$ can be calculated as: (A) the sum of the corresponding column elements (this may be referred to as the Column Sum Approach (CSA))

$$p_{(\ell)k} = \sum_{n=1}^{N_T} X_{n,k}^{(\ell)}$$

which is very simple and direct, (B) the weighted average of the columns (this may be referred to as the weighted CSA or WCSA):

$$p_{(\ell)k} = \sum_{n=1}^{N_T} w_{n,k}^{(\ell)} * X_{n,k}^{(\ell)}$$

where optionally, and not necessarily as explained below, $$\sum_{n=1}^{N_T} w_{n,k}^{(\ell)} = 1.$$

Here, we propose:

$$w_{n,k}^{(\ell)} \sim |X_{n,k}^{(\ell)}|^{\alpha}$$

where $\alpha$ is a degree to be optimized; the consideration includes $\alpha=1$ (multiplication of amplitudes imitates powers of the components) ($\alpha=0$ leads to the case (A) since $$w_{n,k}^{(\ell)} = |X_{n,k}^{(\ell)}|^0 = 1).$$

Here "~" means proportional up to a normalization constant. Note that the normalization of the weights does not influence the angle and is not necessarily (in actual designs it may be adopted to a better FXP (fixed-point) considerations). The case when all weight $$w_{n,k}^{(\ell)}$$

are identical leads to the same angle as in (A). This approach may work better than the prior art which de-phase using single component of the strongest beam, but it is inferior in performance to the described above ASV (Auxiliary Synchronization Vector) approach. This simple approach can also be used for a quick primary AI/ML synchronization. We also note that this simple method may be included in the number of strategies (i.e., treated as a possible strategy) among which the one with the best performance is chosen.

Scrambling of Compressed Bits.

The compressed bits may be transmitted via a secure protocol. This may prevent the $3^{rd}$ party to learn the channel and thus to perform a better jamming of its components or identify the user via its channel (monitored by the third party). The number of bits has to be essentially small, hence we propose to scramble them, via XOR operation, with the "key," e.g., with the seed of the random-sequence-generator which is sent from time-to-time by the base station to the UE. The scrambling does not extend the volume (the number of the bits) but preserves the security of the protocol and privacy of the UE, which will be essential in the 6G and coming generations of the wireless standards.

In one aspect, the wireless communication system comprises a User Equipment (UE) configured to calculate downlink (DL) channel-related information, preprocess the DL channel-related information using a unitary matrix to generate post-processing information, compress the post-processing information to generate transmission data, and communicate the transmission data over a communication channel; and a Base Station configured to receive the transmission data, decompress the received transmission data to reconstruct the post-processing information, and construct a DL precoder utilizing the reconstructed post-processing information.

In another aspect, the User Equipment (UE) for use in a wireless communication system comprises a memory storing computer-executable instructions; and at least one processor coupled to the memory and configured to execute the computer-executable instructions to calculate downlink (DL) channel-related information, preprocess the DL channel-related information using a unitary matrix to generate post-processing information, compress the post-processing information to generate transmission data, and communicate the transmission data over a communication channel.

In a further aspect, the Base Station for use in a wireless communication system comprises a memory storing computer-executable instructions; and at least one processor coupled to the memory and configured to execute the computer-executable instructions to receive transmission data communicated over a communication channel from a User Equipment (UE), decompress the received transmission data to reconstruct post-processing information, utilize the reconstructed post-processing information to govern an optimization process, including the Unitary Matrix used for input modification, and construct a DL precoder, where the precoder comprises a first factorization component (W1) based on the reconstructed post-processing information, with the full precoder being W=W1*W2.

In yet another aspect, a method for use in a wireless communication system comprises calculating downlink (DL) channel-related information at a User Equipment (UE), preprocessing the DL channel-related information using a unitary matrix to generate post-processing information, compressing the post-processing information to generate transmission data, and communicating the transmission data over a communication channel.

In one aspect, the invention provides a wireless communication system, comprising a User Equipment (UE) configured to calculate downlink (DL) channel-related information, preprocess the DL channel-related information using a unitary matrix to generate post-processing information, compress the post-processing information to generate transmission data, and communicate the transmission data over a communication channel, and a Base Station configured to receive the transmission data, decompress the received transmission data to reconstruct the post-processing information, and construct a DL precoder utilizing the reconstructed post-processing information.

In one aspect, the unitary matrix is constructed to optimize DL communication performance, reduce compressed size, or perform a tradeoff of both. This optimization can use various metrics, including DL communication performance, DL capacity, power-related metrics, cosine similarity-related criteria, or a reconstruction error metric. The optimization may use unitary matrix components directly or via a barrier function method and can be performed in steps with different criteria at each step.

In one aspect, the unitary matrix is dynamically adjustable based on feedback from the base station.

In one aspect, the UE applies error correction coding to the transmission data before communication over the communication channel.

In one aspect, the preprocessing of the DL channel-related information includes the use of diagonal unitary matrices to facilitate compression of the post-processing information.

In one aspect, the base station optimizes the reconstruction of the post-processing information based on a comparison between the received data and a predicted model of the DL channel-related information.

In one aspect, the compression of the post-processing information by the UE includes a lossy compression algorithm to reduce the amount of transmission data.

In one aspect, the communication of the transmission data over the communication channel uses a secure transmission protocol to enhance data privacy.

In one aspect, the base station updates its parameters for constructing the DL channel-related information based on historical data patterns observed in the decompressed post-processing information.

In one aspect, the preprocessing of the DL channel-related information by the UE includes applying a Fourier Transform (FT) to the DL channel-related information after using the unitary matrix.

In one aspect, the preprocessing of the DL channel-related information by the UE includes applying a unitary matrix to the DL channel-related information, resulting in improved input similarity across sub-bands, and applying a Fourier Transform (FT) to the modified input resulting from the unitary matrix, as part of the preprocessing step for subsequent compression.

In one aspect, the base station performs DL channel quality estimation based on the reconstructed post-processing information and adjusts its operational parameters accordingly to optimize system performance.

In one aspect, the preprocessing by the UE includes applying a unitary matrix to the DL channel-related information on a per sub-band basis to improve input similarity and performing a compression approach that includes the Fourier Transform as part of the preprocessing step.

In one aspect, the preprocessing of the DL channel-related information by the UE includes modifying the input matrix columns using an auxiliary synchronization vector (ASV) approach, where the ASV is constructed per layer to modify columns of the inputs. The ASV can be optimized for better DL communication performance, better compression, or a tradeoff of both. It can also be constructed based on the averaged correlation channel matrix, using the best eigenvectors of the averaged correlation matrix, the best eigenvectors of the Singular Value Decomposition (SVD) of the input matrix, or the columns of the input matrix selected based on a predetermined strategy.

In one aspect, the preprocessing of the DL channel-related information includes modifying columns using at least one of a Component Sum Approach (CSA) or a Weighted CSA (WCSA), and the weights for the WCSA are optimized based on the amplitude of the input columns.

In one aspect, the system is compatible with a 5G Standard, 5G Advanced, or 6G, and includes a mechanism to switch between standard and modified compression modes using a system bit indicator.

In one aspect, the input columns have prior known power norm and are scaled at the UE to improve compression, and the scaling is reversible at the base station.

In one aspect, the DL precoder incorporates interference treatment by constructing the precoder from the eigenvectors of the correlation matrix of the modified channel. In one aspect, the input to the CSI-compression engine incorporates precoder matrix factorization, with the precoder being $W_n=W_{(A)n}W_{(B)n}$.

In one aspect, the preprocessing includes a unitary modification to set initial parameters for artificial intelligence/machine learning (AI/ML) algorithms, facilitating faster learning and re-learning.

In one aspect, the optimization may utilize barrier functions to remove constraints of unitarity, allowing for unconstrained optimization.

In one aspect, the optimization may be a continuous process or be based on a set of constructed unitary matrices (referred to as strategies). The unitary matrices of the best strategy may be optionally used as seeds for the following continuous optimization.

These aspects and any others described herein may be combined in various ways with each other unless otherwise noted.

The preceding disclosure provides illustration and description but is not intended to be exhaustive or to limit the implementations to the precise form disclosed. Modifications may be made in light of the above disclosure or may be acquired from practice of the implementations. As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it is understood that software and hardware can be used to implement the systems and/or methods based on the description herein. As used herein, satisfying a threshold may, depending on the context, refer to a value being greater than the threshold, greater than or equal to the threshold, less than the threshold, less than or equal to the threshold, equal to the threshold, and/or the like, depending on the context. Although particular combinations of features are recited in the claims and/or disclosed in the specification, these combinations are not intended to limit the disclosure of various implementations. In fact, many of these features may be combined in ways not specifically recited in the claims and/or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like) and may be used interchangeably with "one or more." The phrase "only one" or similar language is used where only one item is intended. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

One or more elements or aspects or steps, or any portion(s) thereof, from one or more of any of the systems and methods described herein, may be combined with one or more elements or aspects or steps, or any portion(s) thereof, from one or more of any of the other systems and methods described herein and combinations thereof, to form one or more additional implementations and/or claims of the present disclosure.

One or more components, steps, features, and/or functions illustrated in the figures may be rearranged and/or combined into a single component, block, feature, or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily refer to the same embodiment.

Some portions of the detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this Application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A wireless communication system, comprising:
a User Equipment (UE) configured to:
calculate downlink (DL) channel-related information,
preprocess the DL channel-related information using a unitary matrix to generate post-processing information,
compress the post-processing information to generate transmission data, and
communicate the transmission data over a communication channel; and
a Base Station configured to:
receive the transmission data,
decompress the received transmission data to reconstruct the post-processing information, and
construct a DL precoder utilizing the reconstructed post-processing information;
wherein the preprocessing of the DL channel-related information further includes using diagonal unitary matrices to facilitate compression of the post-processing information.

2. The wireless communication system of claim 1, wherein the unitary matrix is constructed to optimize at least one of: DL communication performance, reduce compressed size, or balance both DL communication performance and compressed size.

3. The wireless communication system of claim 2, wherein optimization of DL communication performance uses at least one of: a metric related to DL communication performance, DL capacity, power-related metrics, cosine similarity-related criteria (CS), and a reconstruction error metric, wherein the reconstruction error metric relates to a difference between UE post-processing based information and an expected base station reconstructed post-processing based information, and wherein the optimization uses unitary matrix components directly or via a barrier function method.

4. The wireless communication system of claim 1, wherein the unitary matrix is configured to be dynamically adjustable based on feedback from the base station.

5. The wireless communication system of claim 1, wherein the compression of the post-processing information by the UE includes a lossy compression algorithm to reduce an amount of transmission data.

6. The wireless communication system of claim 1, wherein preprocessing the DL channel-related information using a unitary matrix performed by the UE includes an application of a Fourier Transform (FT) to the DL channel-related information after using the unitary matrix.

7. The wireless communication system of claim 1, wherein the base station is configured to perform a DL channel quality estimation based on the reconstructed post-processing information and adjust the base station's operational parameters accordingly to optimize system performance.

8. The wireless communication system of claim 1, wherein the system is compatible with a 5G Standard, 5G Advanced Standard, or 6G Standard, and includes a mechanism to switch between standard and modified compression modes using a communicated system bit indicator.

9. The wireless communication system of claim 1, wherein an input to a CSI-compression engine incorporates precoder matrix factorization, with the precoder being $W_n = W_{(A)n} W_{(B)n}$.

10. The wireless communication system of claim 1, wherein the preprocessing includes a unitary modification to set initial parameters for artificial intelligence/machine learning (AI/ML) algorithms, facilitating faster learning and re-learning.

11. A wireless communication system, comprising:
a User Equipment (UE) configured to:
calculate downlink (DL) channel-related information,
preprocess the DL channel-related information using a unitary matrix to generate post-processing information, compress the post-processing information to generate transmission data, and communicate the transmission data over a communication channel; and
a Base Station configured to:
receive the transmission data,
decompress the received transmission data to reconstruct the post-processing information, and
construct a DL precoder utilizing the reconstructed post-processing information, wherein:
the preprocessing of the DL channel-related information by the UE includes modifying input matrix columns using an auxiliary synchronization vector (ASV) approach, wherein the ASV is constructed based on one of:
a per-layer strategy to modify columns of the input matrix wherein the ASV is optimized to achieve at least one of improved DL Communication performance, improved compression, or a balance between DL communication performance and compression, an averaged correlation channel matrix, using the best eigenvectors of an averaged correlation matrix or best eigenvectors of a Singular Value Decomposition (SVD) of the input matrix, or columns of the input matrix, selected based on a predetermined strategy, or modifying columns using at least one of a Component Sum Approach (CSA) or a Weighted CSA (WCSA) wherein weights for the WCSA are optimized based on amplitudes of the input columns.

12. A wireless communication system, comprising:

a User Equipment (UE) configured to:

calculate downlink (DL) channel-related information, preprocess the DL channel-related information using a unitary matrix to generate post-processing information, compress the post-processing information to generate transmission data, and communicate the transmission data over a communication channel; and a Base Station configured to:

receive the transmission data, decompress the received transmission data to reconstruct the post-processing information, and construct a DL precoder utilizing the reconstructed post-processing information, wherein the DL precoder incorporates interference treatment by constructing the precoder from eigenvectors of a correlation matrix of a modified channel.

* * * * *